United States Patent

(12) United States Patent
Hida

(10) Patent No.: US 9,452,786 B2
(45) Date of Patent: Sep. 27, 2016

(54) SIDE PANEL STRUCTURE FOR VEHICLE

(71) Applicant: HONDA MOTOR CO., LTD., Minato-Ku, Tokyo (JP)

(72) Inventor: Kazunori Hida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 14/359,135

(22) PCT Filed: Oct. 1, 2012

(86) PCT No.: PCT/JP2012/075321
§ 371 (c)(1),
(2) Date: May 19, 2014

(87) PCT Pub. No.: WO2013/077083
PCT Pub. Date: May 30, 2013

(65) Prior Publication Data
US 2014/0319877 A1   Oct. 30, 2014

(30) Foreign Application Priority Data

Nov. 24, 2011   (JP) .................................. 2011-256400

(51) Int. Cl.
*B62D 25/02* (2006.01)
*B62D 25/06* (2006.01)
*B62D 25/04* (2006.01)

(52) U.S. Cl.
CPC ............ *B62D 25/02* (2013.01); *B62D 25/025* (2013.01); *B62D 25/04* (2013.01); *B62D 25/06* (2013.01)

(58) Field of Classification Search
CPC .... B62D 25/02; B62D 25/025; B62D 25/04; B62D 25/06; B62D 29/001; B62D 29/007
See application file for complete search history.

(56) References Cited

U.S. PATENT DOCUMENTS 4,552,400 A * 11/1985 Harasaki ............. B62D 25/025
296/203.03
4,973,103 A * 11/1990 Imajyo .................. B62D 25/02
296/191
(Continued)

FOREIGN PATENT DOCUMENTS

DE   4406615 A1 *  9/1995 ............. B62D 25/02
DE   19522680 C1 *  5/1996 ............. B62D 25/02
(Continued)

OTHER PUBLICATIONS

Office Action mailed Mar. 24, 2015 in corresponding Japanese Patent Application No. P2013-545833 and partial English translation.
(Continued)

*Primary Examiner* — Glenn Dayoan
*Assistant Examiner* — Paul Chenevert
(74) *Attorney, Agent, or Firm* — Carrier Blackman & Associates, P.C.; Joseph P. Carrier; Jeffrey T. Gedeon

(57) ABSTRACT

A side panel structure (20), including a side outer panel (21) provided on the vehicle exterior side, and a side inner panel (22) provided on the vehicle interior (12) side. The side outer panel (21) and the side inner panel (22) form, as a closed cross-section structure, a peripheral edge section forming door openings (35, 36). The side outer panel (21) comprises an inner frame (26) formed from a high-strength steel sheet having a high tensile strength, and an outer frame (27) provided to the outer periphery section (26a) of the inner frame (26). The outer frame (27) is formed from a low-strength steel sheet having a low tensile strength.

11 Claims, 17 Drawing Sheets

(56) References Cited

U.S. PATENT DOCUMENTS

| | | | | | |
|---|---|---|---|---|---|
| 5,443,297 | A | * | 8/1995 | Tanaka | B62D 25/02 296/203.03 |
| 5,938,275 | A | * | 8/1999 | Kleinhans | B62D 25/02 296/191 |
| 6,073,992 | A | * | 6/2000 | Yamauchi | B62D 23/00 296/187.12 |
| 7,914,068 | B2 | | 3/2011 | Mizohata | |
| 2002/0190544 | A1 | * | 12/2002 | Yamamoto | B62D 25/02 296/205 |
| 2003/0102697 | A1 | * | 6/2003 | Yakata | B62D 25/02 296/209 |
| 2005/0046238 | A1 | * | 3/2005 | Miyoshi | B62D 25/2036 296/203.03 |
| 2005/0189790 | A1 | * | 9/2005 | Chernoff | B62D 25/02 296/193.05 |
| 2010/0117400 | A1 | * | 5/2010 | Eberlein | B62D 29/007 296/193.01 |
| 2010/0259073 | A1 | | 10/2010 | Gruneklee et al. | |
| 2011/0057476 | A1 | * | 3/2011 | Beck | B62D 25/02 296/181.2 |
| 2011/0095567 | A1 | * | 4/2011 | Ishigame | B62D 21/157 296/187.03 |
| 2011/0233970 | A1 | | 9/2011 | Nagai et al. | |
| 2011/0248527 | A1 | | 10/2011 | Ono | |
| 2012/0098297 | A1 | * | 4/2012 | Kurokawa | B62D 25/02 296/193.06 |

FOREIGN PATENT DOCUMENTS

| | | | | |
|---|---|---|---|---|
| DE | 19714631 A1 | * | 10/1997 | B21D 26/055 |
| DE | 102007037510 A1 | * | 2/2009 | B62D 25/02 |
| DE | 102007038087 A1 | * | 2/2009 | B62D 25/02 |
| DE | 102007047036 A1 | * | 4/2009 | B23K 11/11 |
| EP | 1170198 A2 | * | 1/2002 | B62D 25/02 |
| EP | 1172454 A1 | * | 1/2002 | B62D 25/02 |
| FR | 2690404 A1 | * | 10/1993 | B60J 10/0022 |
| GB | 498671 A | * | 1/1939 | B62D 25/02 |
| JP | H01244984 A | | 9/1989 | |
| JP | H0263981 A | | 3/1990 | |
| JP | 06-286651 A | | 10/1994 | |
| JP | H11227635 A | | 8/1999 | |
| JP | 2001-180518 A | | 7/2001 | |
| JP | 2002102980 A | | 4/2002 | |
| JP | 2004055265 A | * | 2/2004 | H05B 3/00 |
| JP | 2005-008021 A | | 1/2005 | |
| JP | 2005-075132 A | | 3/2005 | |
| JP | 2005330504 A | * | 12/2005 | C21D 9/00 |
| JP | 2006289425 A | * | 10/2006 | B21D 22/20 |
| JP | 2006306211 A | * | 11/2006 | B62D 21/00 |
| JP | 2009061473 A | * | 3/2009 | B21D 22/20 |
| JP | 2009248585 A | | 10/2009 | |
| JP | 2010260536 A | | 11/2010 | |
| JP | 2011-195107 A | | 10/2011 | |
| JP | 2011-195109 A | | 10/2011 | |
| JP | 2011-195110 A | | 10/2011 | |
| JP | 2011195108 A | | 10/2011 | |

OTHER PUBLICATIONS

Supplementary Search Report issued in the counterpart European Patent Application No. 12852106.9 dated Jun. 19, 2015.

* cited by examiner

FIG. 15
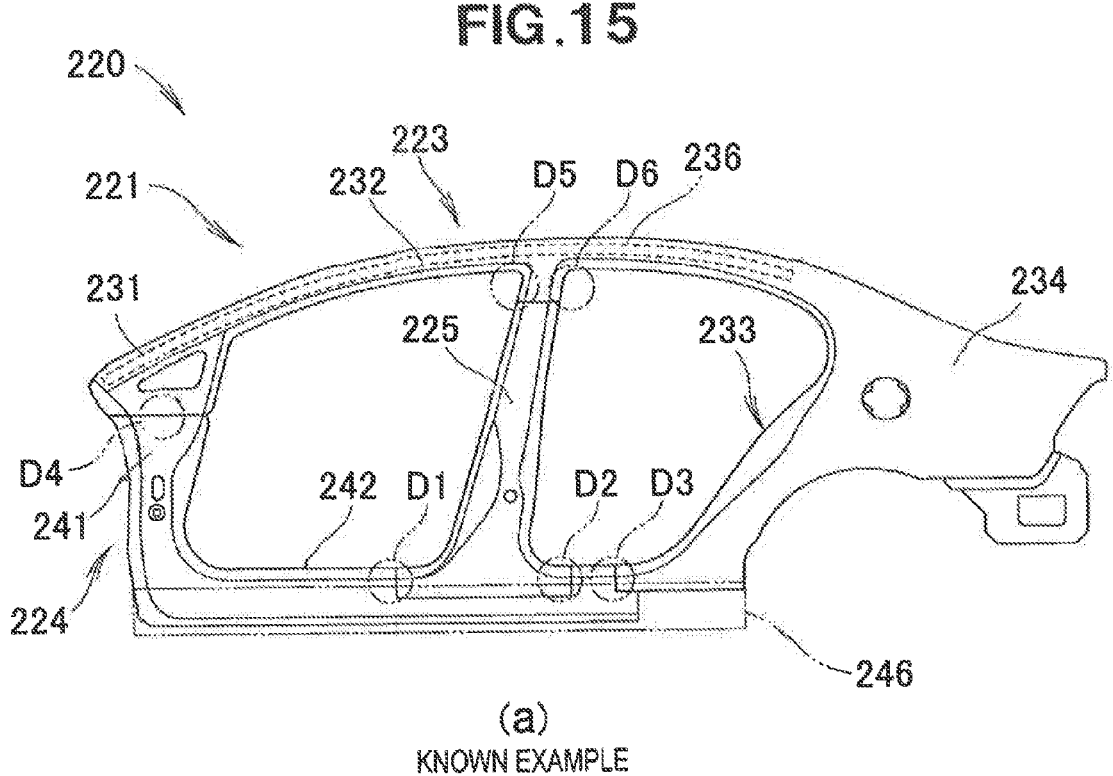
(a) KNOWN EXAMPLE
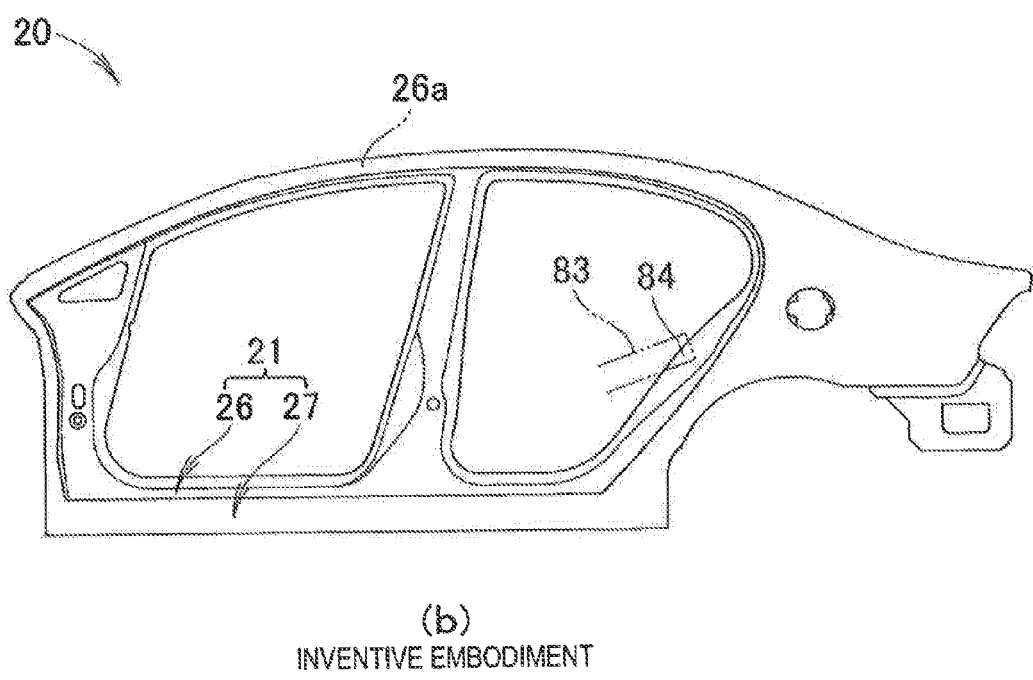
(b) INVENTIVE EMBODIMENT

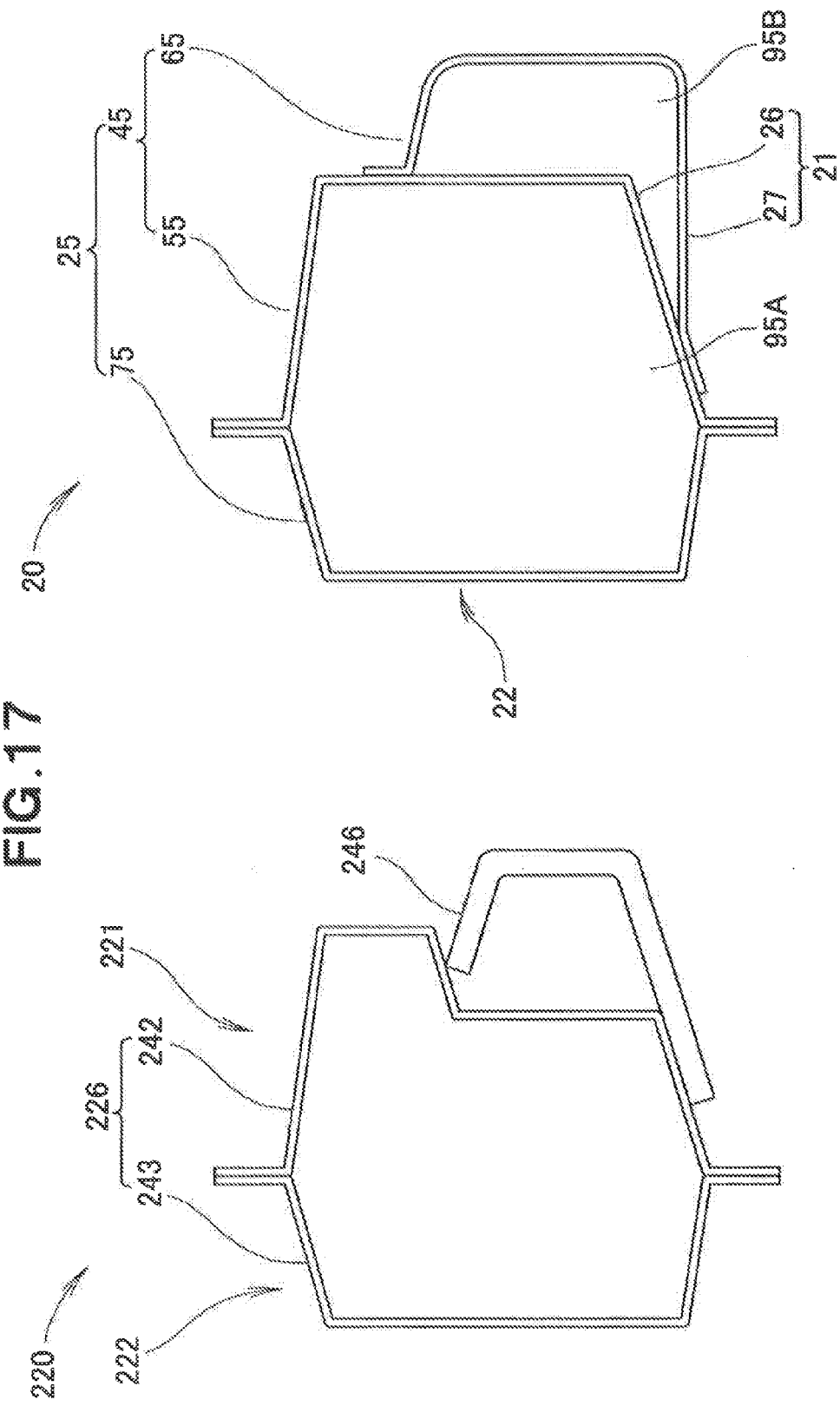

SIDE PANEL STRUCTURE FOR VEHICLE

TECHNICAL FIELD

The present invention relates to a vehicular side panel structure in which a structure of a closed cross-section is formed by a side outer panel and a side inner panel at the periphery of a door opening.

BACKGROUND ART

Generally, the vehicular side panel structure includes a side outer panel provided on a vehicle exterior side and a side inner panel provided on a vehicle interior side. The side outer panel includes an upper frame portion including an upper portion of a front pillar outer, a roof rail outer, a rear pillar outer, and a rear fender panel, a lower frame portion including a lower portion of the front pillar outer and a side sill outer, a center pillar outer that joins the upper frame portion to the lower frame portion, and a side sill garnish that covers the side sill outer of the lower frame portion.

The lower frame portion is joined to the upper frame portion, thereby forming a side outer panel frame portion, and the side outer panel frame portion is joined to a center pillar outer and the side sill outer covers the side sill garnish. The upper frame portion is generally formed of a steel sheet, and the lower frame portion and the center pillar outer are formed of a high tensile steel sheet or the like. The side sill garnish is formed of resin.

In the above side panel structure, the roof rail outer of the side outer panel frame portion is formed of a standard steel sheet which is easy to be press-molded. Therefore, a sharp form can be achieved by press working, and a gap generated adjacent to a door can be reduced, thereby improving appearance property. Since the center pillar outer of the side outer panel is formed of a high strength steel sheet, it is possible to exert bearing force against a side collision load (see JP 2011-195107, for example).

In the vehicular side panel structure disclosed in JP 2011-195107, optimal material can be selected for the upper frame portion including the upper portion of the front pillar outer, roof rail outer, rear pillar outer, and rear fender panel, the lower frame portion including the lower portion of the front pillar outer and the side sill outer, and the center pillar outer that joins the upper frame portion to the lower frame portion. However, since the side outer panel are divided into the upper frame portion, lower frame portion and center pillar outer, and these the upper frame portion, lower frame portion, and center pillar outer are formed in a joined manner, seams are generated at the joining parts of these components.

It is necessary to apply sealer to the seams generated at the joining parts of these components in order to prevent rainwater penetration. This sealer applying work is quite difficult because it is manually carried out, and at the same time the seams deteriorate the external appearance. An external surface shape of the side sill cannot be formed only by the side sill outer, and therefore the side outer panel has to be covered with the side sill garnish which is a separate body. Further, since the roof rail outer of the upper frame portion is formed of the standard steel sheet, a reinforcing member is added to increase strength, thereby increasing the weight.

SUMMARY OF INVENTION

Technical Problem

An object of the present invention is to provide a vehicular side panel structure, whereby a reinforcing member necessary for the structure of the closed cross-section at the periphery of the door opening can be eliminated and the weight of the vehicle body can be reduced. Additionally, the object of the present invention is to provide the vehicular side panel structure, which can eliminate the seams and further can contribute to rigidity of the vehicle body and collision performance.

Solution to Problem

According to a first aspect of the present invention, there is provided a vehicular side panel structure which includes a side outer panel provided in a vehicle exterior side and a side inner panel provided on a vehicle interior side, and also includes a structure of closed cross-section formed by the side outer panel and the side inner panel at a periphery of a door opening, and the side outer panel includes an inner frame formed of a high strength steel sheet having high tensile strength, and an outer frame which is provided at an outer peripheral portion of the inner frame and forms external appearance of the vehicle body.

According to a second aspect of the present invention, the structure in which the closed cross-section is formed preferably includes a roof side rail, and a closed cross-section shape is formed on the roof side rail by the inner frame and the outer frame.

According to a third aspect of the present invention, the structure in which the closed cross-section is formed preferably includes a side sill, and a closed cross-section formed by the inner frame and the outer frame is formed on the side sill.

According to a forth aspect of the present invention, the structure in which the closed cross-section is formed preferably includes a front pillar, and the front pillar includes a closed cross-section formed by a front pillar inner of the side inner panel and the inner frame, and the outer frame is joined to a front fender.

According to a fifth aspect of the present invention, the structure in which the closed cross-section is formed preferably includes a rear pillar, and the rear pillar includes a closed cross-section formed by the inner frame and the outer frame which are joined and a rear wheel house extension.

According to a sixth aspect of the present invention, the inner frame is preferably either high tensile strength steel material or a hot stamp product.

According to a seventh aspect of the present invention, the outer frame is preferably any one of a low strength steel sheet, an aluminum alloy sheet, and a resin sheet.

According to a seventh aspect of the present invention, the structure in which the closed cross-section is formed preferably includes a side sill, and the side sill includes a closed cross-section formed by the inner frame and the side inner panel, and the outer frame forms an external surface below the door opening.

According to a ninth aspect of the present invention, the inner frame is preferably formed by applying hot stamp molding to the high strength steel sheet, the structure in which the closed cross-section is formed preferably includes a front pillar, a center pillar, and a rear pillar, respective strength of the front pillar, the center pillar, and the rear pillar are preferably varied by changing conditions of the hot stamp molding for the inner frame or by joining a plurality of high tensile strength steel material having different strength so as to allow the front pillar, the center pillar, and the rear pillar to have different tensile strength.

According to a tenth aspect of the present invention, the outer frame of the side outer panel is preferably joined to a rear edge of a front fender that covers the side of a front portion of the vehicle body.

According to an eleventh aspect of the present invention, a receiving surface configured to receive an input from a door beam of a vehicle door is preferably formed on the inner frame of the side outer panel.

Advantageous Effects of Invention

The vehicular side panel structure according to the first aspect includes the side outer panel provided on the vehicle exterior side and the side inner panel provided on the vehicle interior side, and the structure of closed cross-section is formed by the side outer panel and the side inner panel at the periphery of the door opening. The side outer panel includes the inner frame formed of the high strength steel sheet having the high tensile strength and the outer frame formed of the material by which the external appearance can be easily formed at the outer peripheral portion of the inner frame. As a result, the inner frame can be formed by one steel sheet even when the side outer panel is formed of the high strength steel sheet having the high strength and rigidity. With this configuration, the inner frame of the side outer panel formed of the high strength steel sheet surrounds an entire peripheral portion of the door opening without any seams. Consequently, a side wall of the vehicle body including the closed cross-section formed by the inner frame and the side inner panel at the peripheral portion of the door opening increases the rigidity of the vehicle body and also improves collision-resistant performance. Further, it is not necessary to apply the sealer for preventing entry of rainwater because there is no seam (seal line) at the inner frame. As a result, the sealer applying work can be eliminated and further the external appearance of a vehicle body is improved. Since the inner frame is formed of the high strength steel sheet having the high tensile strength, it is necessary to eliminate the reinforcing member necessary for the structure of the closed cross-section at the periphery of the door opening according to the related art. As a result, the weight of a vehicle body can be reduced. Since the outer frame of the outer peripheral portion of the inner frame is formed of the material by which the external appearance can be easily formed, a ridgeline of the roof side rail of the side outer panel facing an outer edge of the door opening can be formed sharply. As a result, appearance property of the vehicle body can be improved.

The roof side rail according to the second aspect has the closed cross-section shape, thereby improving the rigidity of the vehicle body. Accordingly, impact resistance of the vehicle in the event of side collision may be improved, and other member such as the reinforcing member can be eliminated.

The side sill according to the third aspect includes the closed cross-section formed thereon, thereby increasing the rigidity of the vehicle body. Accordingly, the impact resistance of the vehicle in the event of side collision may be improved, and other member such as the reinforcing member can be eliminated.

The front pillar according to the forth aspect includes the closed cross-section formed thereon, thereby increasing the rigidity of the vehicle body. Accordingly, the impact resistance of the vehicle in the event of side collision may be improved, and other member such as the reinforcing member can be eliminated.

The rear pillar according to the fifth aspect includes the closed cross-section formed thereon, thereby increasing the rigidity of the vehicle body. Accordingly, the impact resistance of the vehicle in the event of side collision may be improved, and other member such as the reinforcing member can be eliminated.

The inner frame according to the sixth aspect is either the high tensile strength steel material or the hot stamp product, and a high strength steel sheet having the strength of 1000 MPa or more can be used, thereby more improving the rigidity of the vehicle body and collision performance.

The outer frame according to the seventh aspect is one or more of a low strength steel sheet, aluminum alloy sheet, and a resin sheet, and the outer frame can have the external appearance of can be more improved by the weight reduction, sharp forming, and coating property as a design component that does not support a load.

In accordance with the eighth aspect of the invention, the side sill as a structure includes the closed cross-section formed thereon by the inner frame and the side inner panel, and the external surface below the door opening is formed by the outer frame. Therefore, the side sill garnish which is the separate body becomes unnecessary. With this configuration, the side sill garnish such as a side spoiler may be provided to only a type of vehicle that requires the side sill garnish due to design. Accordingly, the cost for the vehicle body of a basic type of vehicle can be reduced.

According to the ninth aspect of the invention, the inner frame is formed of the high strength steel sheet or the hot stamp molding, and the respective strength of the front pillar, center pillar or rear pillar as the structure is varied by changing conditions of the hot stamp molding for the inner frame or by joining a plurality of high tensile strength steel material having different strength so as to allow the front pillar, center pillar, or rear pillar to have a different tensile strength. By utilizing a known technology of the hot stamp molding with different strength, or a known tailored blank technique, the front pillar, center pillar or rear pillar can have the different tensile strength, and also appropriate strength is added to the front pillar, center pillar, or rear pillar such that an amount of protrusion to the vehicle interior side can be controlled in the event of side collision.

According to the tenth aspect of the invention, the rear edge of the front fender that covers the side of the front portion of the vehicle body is fixed to the outer frame of the side outer panel. Therefore, the outer panel serves as a substitute for an enclosure which is a separate component that covers the space between the front pillar and the front fender with the outer frame. As a result, the enclosure can be eliminated, thereby achieving both cost reduction of the vehicle body and weight reduction of the vehicle body.

In accordance with the eleventh aspect of the invention, the receiving surface configured to receive an input from the door beam of the vehicle door is formed on the inner frame of the side outer panel. Therefore, the load of the side collision can be directly received by the inner frame formed of the high strength steel sheet having the high tensile strength from the door beam that is provided on the vehicle door covering the door opening and increases the rigidity and strength of the vehicle door. As a result, collision performance of the side portion of the vehicle body can be improved.

BRIEF DESCRIPTION OF DRAWINGS

FIGS. 15(a) and 15(b) are diagrams illustrating comparison of the side panel structure illustrated in FIG. 2. FIG. 15(a) is prior art while FIG. 15(b) is the present invention.

FIG. 16(a) is prior art while FIG. 16(b) is the present invention.

FIGS. 17(a) and 17(b) are diagrams illustrating comparison of a side sill of the vehicular side panel structure illustrated in FIG. 2. FIG. 17(a) is prior art while FIG. 17(b) is the present invention.

MODE FOR CARRYING OUT THE INVENTION

A preferred embodiment according to the present invention will be described in detail below with reference to the accompanying drawings.

Embodiments

Figure 1:
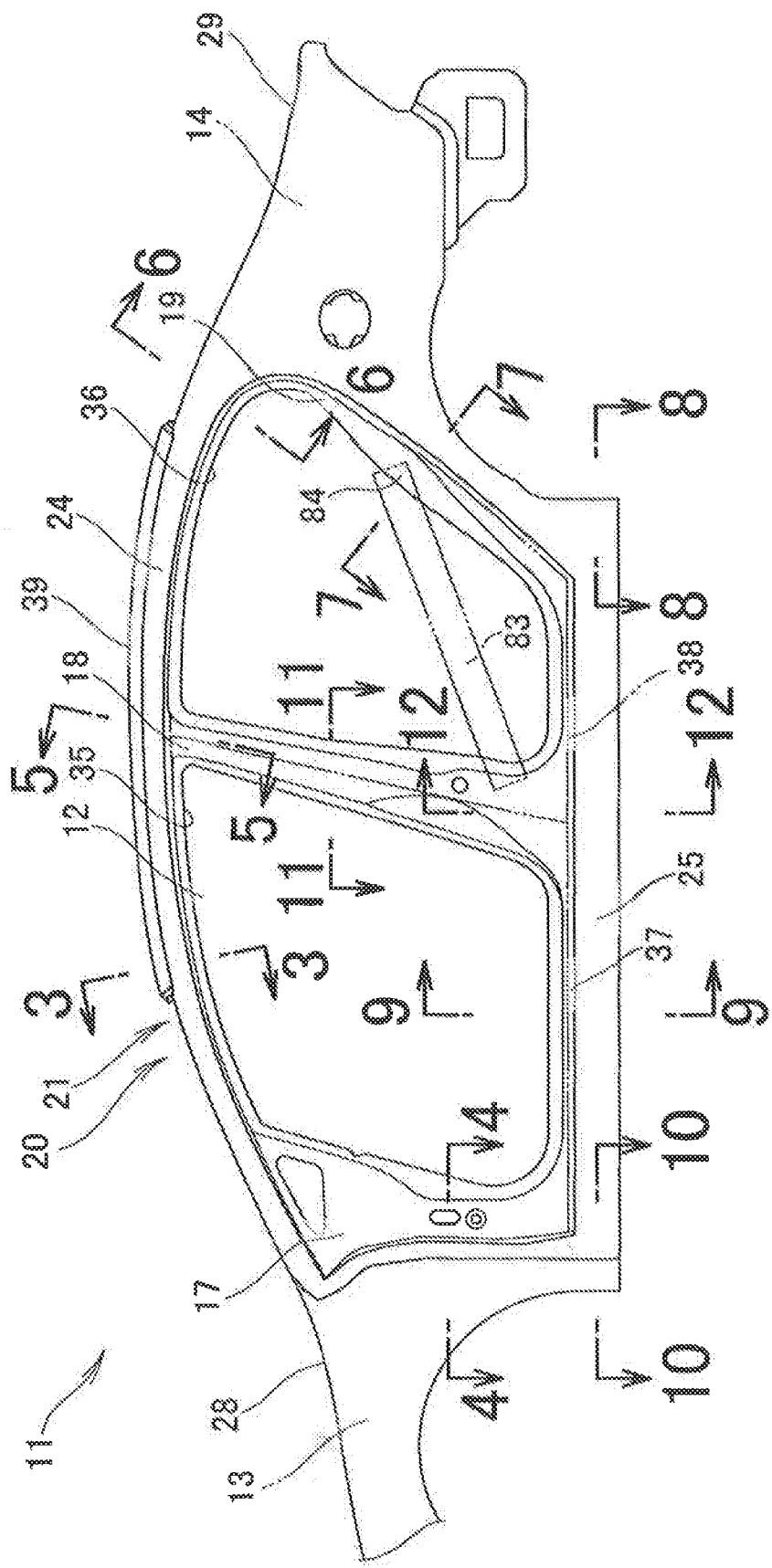
FIG. 1 is a side view illustrating a vehicle in which a vehicular side panel structure according to the present invention is adopted.
Figure 2:
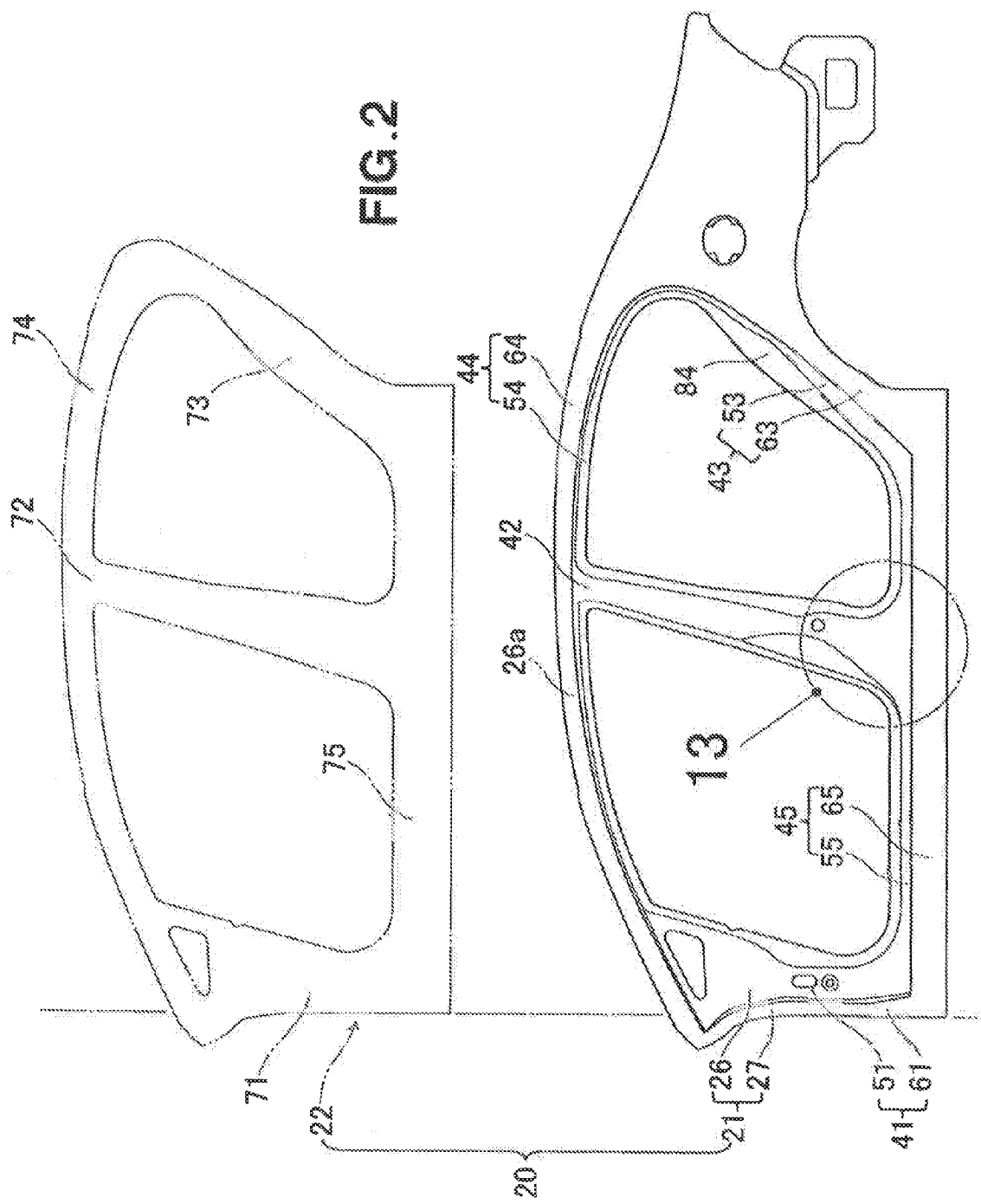
FIG. 2 is a side view of the vehicular side panel structure according to the present invention.

As illustrated in FIGS. 1 and 2, a vehicle body 11 includes a side panel structure 20 for a vehicle on the side portion thereof. An engine room 13 is formed in front of a vehicle interior 12, and a trunk room 14 is formed behind the vehicle interior 12.

The side panel structure 20 for a vehicle includes a front pillar 17 forming a vertical framework at the side of a front portion of the vehicle body 11, a center pillar 18 forming a vertical framework at the side of a center of the vehicle body 11, a rear pillar 19 forming a vertical framework at the side of a rear portion of the vehicle body 11, a roof side rail 24 forming a vertical framework at the side of an upper portion of the vehicle body 11, and a side sill 25 forming a lateral framework at the side of a lower portion of the vehicle body 11.

A rear edge 28a of a front fender 28 (see FIG. 4) is fixed to the front pillar 17. The roof side rail 24 connects an upper end of the front pillar 17, an upper end of the center pillar 18, and an upper end of the rear pillar 19. The side sill 25 connects a lower end of the front pillar 17, a lower end of the center pillar 18, and a lower end of the rear pillar 19.

More specifically, the front pillar 17, center pillar 18, rear pillar 19, roof side rail 24, side sill 25, and rear fender 29 are formed on the side panel structure 20 for a vehicle by joining a side outer panel 21 provided on a vehicle exterior side to a side inner panel 22 provided on a vehicle interior 12 side.

In other words, the front pillar 17, center pillar 18, rear pillar 19, roof side rail 24, and side sill 25, and the side outer panel 21 and the side inner panel 22 form front and rear door openings 35 and 36. A closed cross-section is formed by joining the side outer panel 21 to the side inner panel 22. A front door 37 is formed at the door opening 35 in a freely openable and closable manner, and a rear door 38 is formed at the door opening 36 in a freely openable and closable manner. A roof panel 39 is mounted on the roof side rail 24 in a vehicle width direction.

The side outer panel 21 includes an inner frame 26 formed of a high strength steel sheet having high tensile strength, and an outer frame 27 provided at an outer peripheral portion 26a of the inner frame 26 and formed of a low strength steel sheet having low tensile strength. The inner frame 26 and the side inner panel 22 form the closed cross-section that bears rigidity of the vehicle body and collision performance. The side inner panel 22 includes the front pillar 17, center pillar 18, rear pillar 19, roof side rail 24, side sill 25, and an outer plate of a rear fender 29, and is provided on the vehicle interior 12 side. The outer frame 27 forms a design surface on the exterior side of the door, and joins the design surface to an outer periphery of the inner frame 26, thereby improving appearance property of the front pillar 17, rear pillar 19, roof side rail 24, side sill 25, and rear fender 29.

The high strength steel sheet having high tensile strength of the inner frame 26 is the steel sheet of about 500 to 1500 MPa, and is press-formed while heating the high tensile steel sheet including hot-stamping material press forming, and then hardened to add more tensile strength. The press-forming in which the high tensile steel sheet is press-formed while being heated and rapidly cooled for hardening the steel sheet to increase the tensile strength is referred to as hot stamp molding. Hard material is difficult to be press-formed, and cannot be adopted for the external surface of the vehicle body that involves the external appearance design including a sharp ridgeline. Other material such as high tensile strength steel (hereinafter referred to as high tension material), a cold-press molded product, and a tailored blank product may be used depending on the vehicle body shape or the vehicle body configuration although the tensile strength of these material is slightly inferior to a hot stamp molded product.

A steel sheet (standard steel sheet) having the strength of 270 MPa class is used as the low strength steel sheet having the low tensile strength. The standard steel sheet has high ductility and good moldability, and therefore a design line of the vehicle body 11 can be sharply formed by the cold-press molding. In other words, the standard steel sheet is soft and easy to be molded.

A cold-rolled steel sheet having tensile strength of 270 MPa or more may be used as the standard steel sheet, and the high tensile steel sheet generally has the tensile strength of 340 to 790 MPa. However, there is also another view that the high tensile steel sheet has the tensile strength of 490 MPa or more. This high tensile steel sheet is included in the high strength steel sheet according to the present invention.

The hot stamp molding (hot stamp method) is a method in which deformation is facilitated by heating the high tensile steel sheet including the high tension material, and the strength higher than before molding can be achieved by molding the steel sheet in a die and rapidly cooling the steel sheet. More specifically, the tensile strength can be raised up to about 1500 MPa by heating and rapidly cooling the high tensile steel sheet. The outer frame 27 forms the external appearance without giving any load to the vehicle body, and therefore an aluminum alloy sheet or a resin sheet may be used instead of the low strength steel sheet having the low tensile strength.

The side outer panel 21 includes a front pillar outer (front pillar portion) 41, a center pillar outer (center pillar portion) 42, a rear pillar outer (rear pillar portion) 43, a roof side rail outer (roof side portion) 44, a side sill outer (side sill portion) 45, and a rear fender 29 formed by joining the inner frame 26 to the outer frame 27.

The front pillar outer 41 includes an inner front pillar portion 51 of the inner frame 26 and an outer front pillar portion 61 of the outer frame 27. The center pillar outer 42 is formed of only the inner frame 26. The rear pillar outer 43 includes an inner rear pillar portion 53 of the inner frame 26 and an outer rear pillar portion 63 of the outer frame 27.

The roof side rail outer 44 includes an inner roof side rail portion 54 of the inner frame 26 and an outer roof side rail portion 64 of the outer frame 27. The side sill outer 45 includes an inner side sill portion 55 of the inner frame 26 and an outer side sill portion 65 of the outer frame 27.

In other words, the inner frame 26 includes the inner front pillar portion 51, center pillar outer 42, inner rear pillar portion 53, inner roof side rail portion 54, and inner side sill portion 55. The outer frame 27 includes the outer front pillar portion 61, outer rear pillar portion 63, outer roof side rail portion 64, outer side sill portion 65, and rear fender 29.

The inner frame 26 is formed by applying the hot stamp molding to the high strength steel sheet. The respective strength of the front pillar 17, center pillar 18, or rear pillar 19 as the structure may be varied by changing conditions of the hot stamp molding for the inner frame 26 so as to allow the front pillar 17, center pillar 18, or rear pillar 19 to have a different tensile strength. A plurality of high tension material having different strength may be joined, too.

A metal workpiece having portions of different strength manufactured by a hot stamp process and a manufacturing method thereof are disclosed in JP 2004-55265 A titled "Constant Electric Power Energization Heating Method of Metal Plate", JP 2006-306211 A titled "Welding Structural Member of Tailored Blank Material", JP 2005-330504 A titled "Partial Heat Treatment Method for Member to Be Heat-Treated and Apparatus Thereof", JP 2006-289425 A titled "Hot Press Forming Method and Apparatus Thereof", JP 2009-61473 A titled "Method for Manufacturing High-Strength Component", and so on.

Utilizing the above technologies, the front pillar 17, center pillar 18, or rear pillar 19 can be made to have the different tensile strength, and the inner frame 26 can be manufactured at low cost with higher productivity.

As an example, a high tensile steel sheet including the hot-stamping material is used, and the tensile strength of the center pillar outer 42 is set about 1500 MPa by changing a heating temperature and a cooling speed for the center pillar outer 42, and also the tensile strength of the inner front pillar portion 51, inner rear pillar portion 53, inner roof side rail portion 54, and inner side sill portion 55 is set about 980 MPa by changing the heating temperature and cooling speed for the inner front pillar portion 51, inner rear pillar portion 53, inner roof side rail portion 54, and inner side sill portion 55. As a result, the tensile strength optimal for the side collision performance can be added to the inner frame 26.

Further, a lower portion of the center pillar outer 42 may be formed more fragile than an upper portion thereof so as to control a protruding position and an amount of protrusion to the vehicle interior in the event of the side collision.

The side inner panel 22 includes a front pillar inner 71, a center pillar inner 72, a rear pillar inner 73, a roof side rail inner 74, and a side sill inner 75. The side inner panel 22 keeps the high strength by a thick standard steel sheet or the high tensile steel sheet.

The front pillar 17, center pillar 18, rear pillar 19, roof side rail 24, and side sill 25 are formed by the inner frame 26 of the side outer panel 21 having the high strength and the side inner panel 22 having the high strength on the closed cross-section having the high strength.

Figure 3:
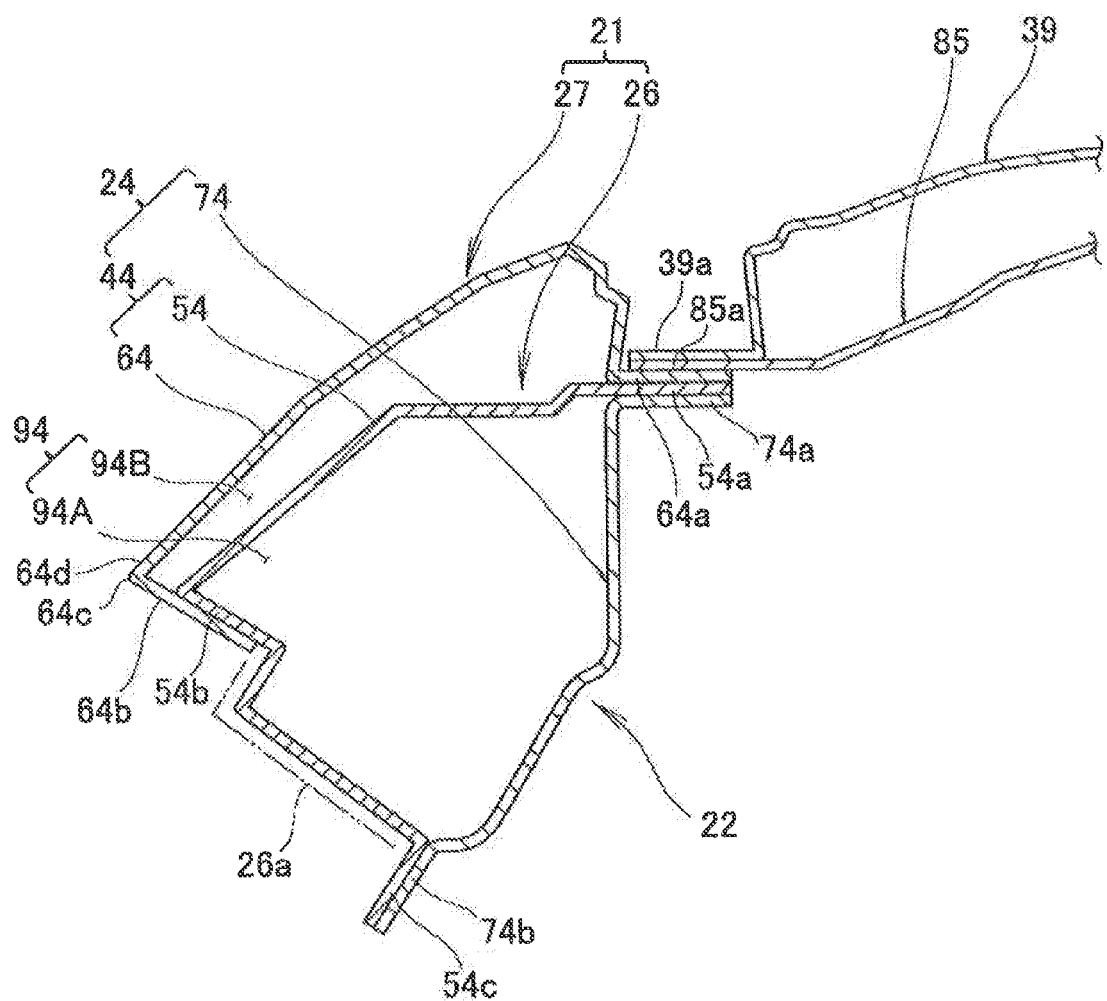
FIG. 3 is a cross-sectional view taken along line 3-3 of FIG. 1.

Referring to FIG. 3, the roof side rail 24 as a structure includes the roof side rail outer 44 and the roof side rail inner 74. The roof side rail 24 is provided with a roof reinforcing rail (roof arch) 85 extending in a vehicle width direction. The roof panel 39 is disposed on an upper portion of this roof reinforcing rail 85. The roof panel 39 is reinforced by the roof reinforcing rail 85.

The outer roof side rail portion 64 of the outer frame 27 of the side outer panel 21 includes an upper flange 64a protruded to the vehicle interior 12 side. The inner roof side rail portion 54 of the inner frame 26 includes an intermediate flange 54a protruded to the vehicle interior 12 side. The upper flange 64a is joined to the intermediate flange 54a. The outer roof side rail portion 64 includes a lower flange 64b on the vehicle exterior side. The lower flange 64b is bent toward a vehicle exterior side wall 54b of the inner roof side rail portion 54 of the inner frame 26, and faces an upper edge of the doors (front and rear doors) 37 and 38. The lower flange 64b is joined to the vehicle exterior side wall 54b. The joined part is hidden behind the bent lower surface and the doors (front and rear doors) 37 and 38, and does not deteriorate the external appearance. Also, the intermediate flange 54a of the inner frame 26 on the vehicle interior 12 side is joined to an upper bent portion 74a of the roof side rail inner 74 later described, together with an end portion 39a of the roof panel 39 and an end portion 85a of the roof reinforcing rail 85.

Further, a lower end 54c extending to the vehicle exterior side more than the vehicle exterior side wall 54b of the inner roof side rail portion 54 is joined to a lower bent portion 74b of the roof side rail inner 74, and the roof side rail 24 forms a closed cross-section 94. The outer roof side rail portion 64 of the outer frame 27 forms external appearance above the door openings 35 and 36 (FIG. 1). Since the outer roof side rail portion 64 is formed of the standard steel sheet, and the outer roof side rail portion has high ductility and it is possible to form the ridgeline 64c that curves from the lower end of the side wall 64d to the vehicle interior 12 side into a sharp design form, thereby improving the external appearance.

With the above-described joined configuration, a first roof closed cross-section 94A that bears the rigidity of the vehicle body and collision performance is formed by the inner roof side rail portion 54 of the inner frame 26 and the roof side rail inner 74 of the side inner panel 22, and a second roof closed cross-section 94B that forms a design surface is formed by the inner roof side rail portion 54 of the inner frame 26 and the outer roof side rail portion 64.

Figure 4:
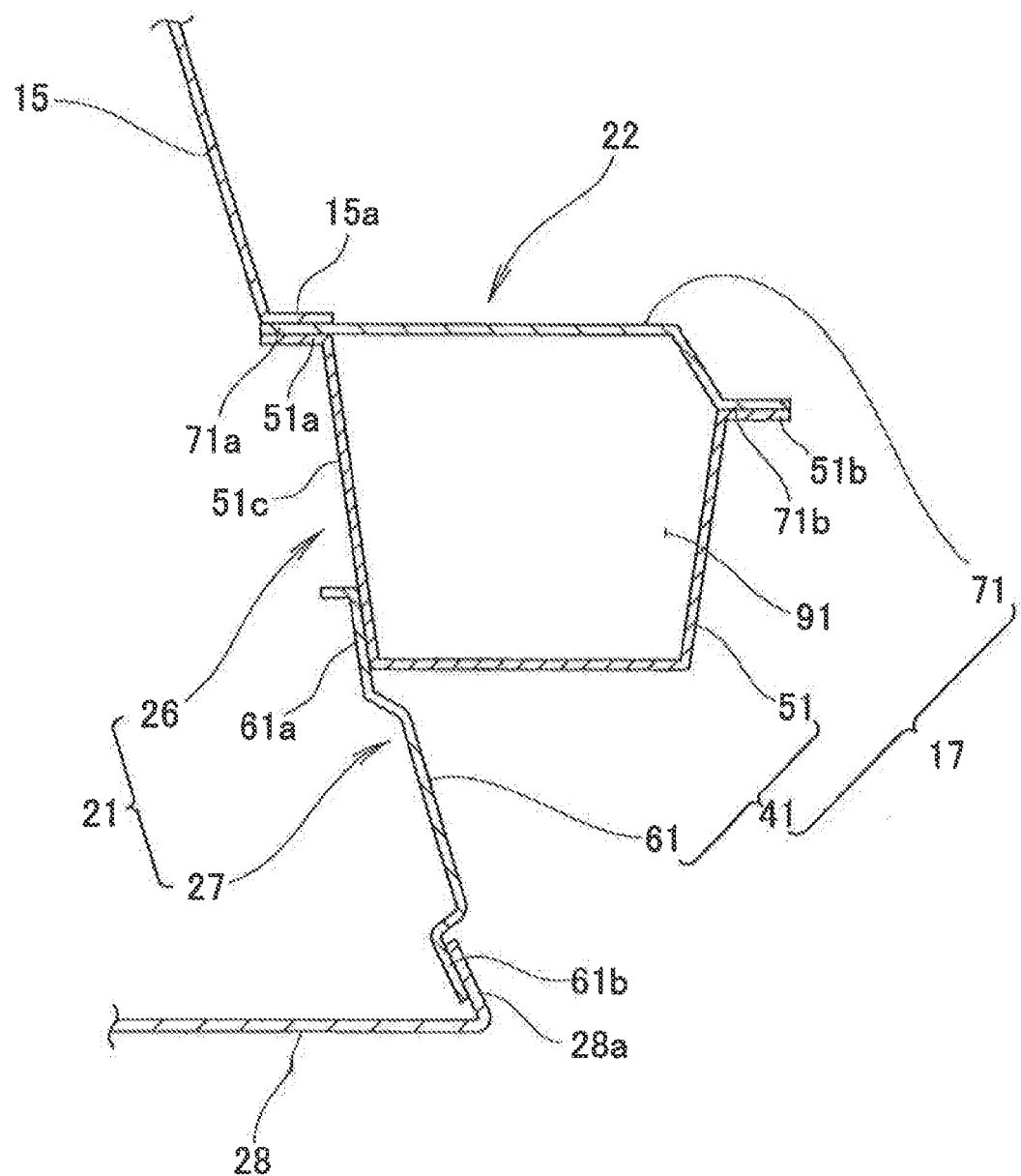
FIG. 4 is a cross-sectional view taken along a line 4-4 of FIG. 1.

As illustrated in FIG. 4, the front pillar 17 includes the front pillar outer 41 and the front pillar inner 71. The front pillar 17 forms a closed cross-section 91 on front pillar side bearing the rigidity of the vehicle body and collision performance, together with the inner front pillar portion 51 of the inner frame 26 and the front pillar inner 71 of the side inner panel 22. The external appearance below the front and rear door openings 35 and 36 is formed by the outer front pillar portion 61 of the outer frame 27.

At a lower portion of the front pillar inner 71, a dashboard lower 15 whereby the vehicle interior 12 (FIG. 1) is separated from the engine room 13 is connected. More specifically, a front end 71a of the front pillar inner 71 of the side inner panel 22 is joined to a side end portion 15a of the dashboard lower 15 and a front end 51a of the inner front pillar portion 51 formed of the high strength steel sheet of the inner frame 26. A rear end 71b of the front pillar inner 71 is joined to a rear end 51b of the inner front pillar portion 51. A front wall 51c of the inner front pillar portion 51 is joined to an inner end portion 61a of the outer front pillar portion 61 formed of the low strength steel sheet of the outer frame 27. An outer end portion 61b of an outer front pillar portion 61 is joined to a rear edge 28a of the front fender 28. In other words, the outer frame 27 (outer front pillar portion 61) of the side outer panel 21 is joined to the rear edge 28a of the front fender 28 that covers the side of the front portion of the vehicle body.

Figure 5:
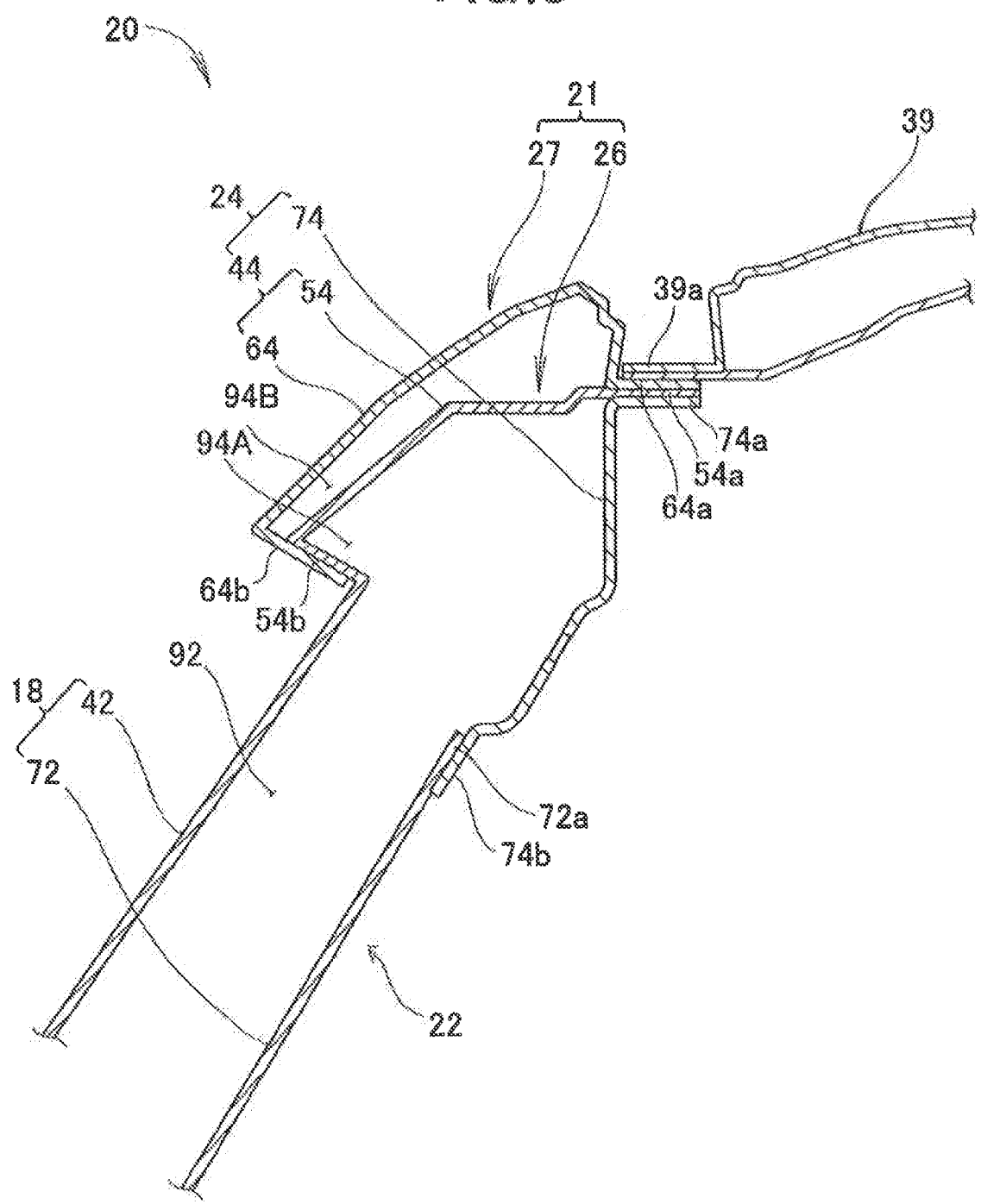
FIG. 5 is a cross-sectional view taken along line 5-5 of FIG. 1.
Figure 11:
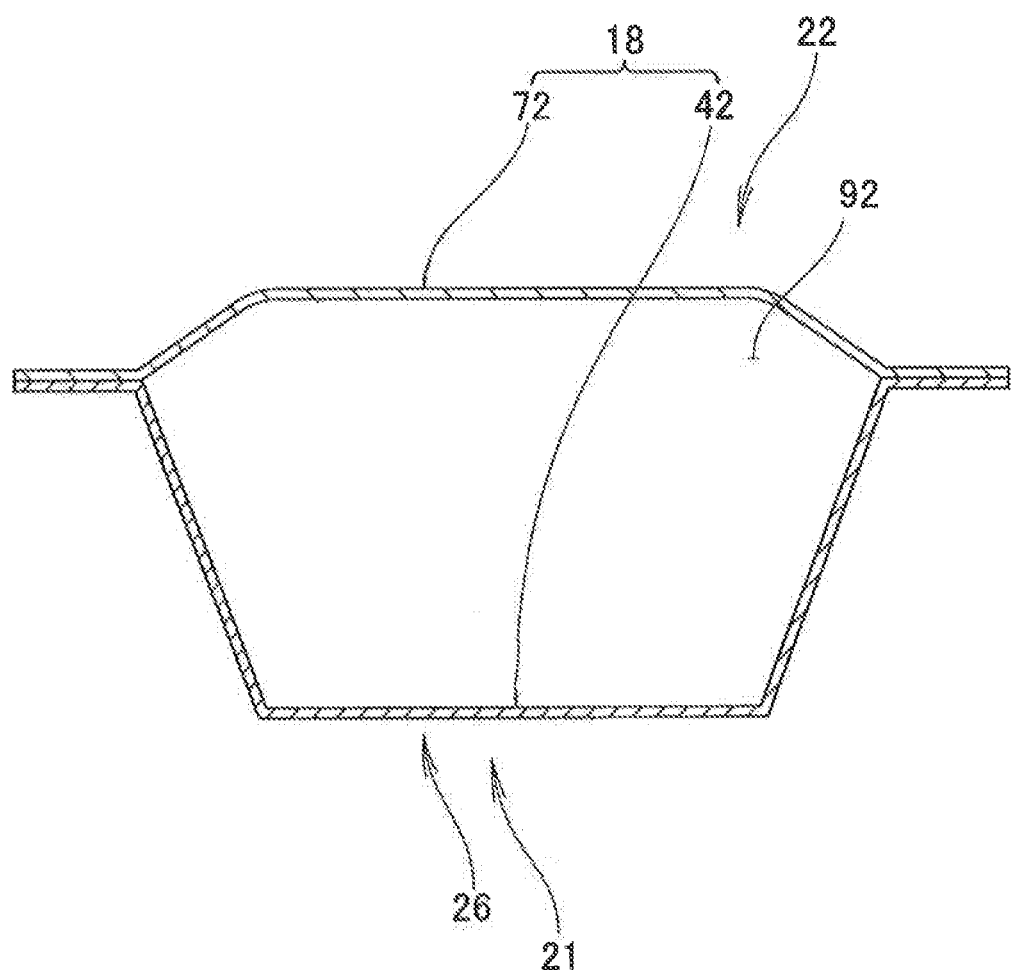
FIG. 11 is a cross-sectional view taken along line 11-11 of FIG. 1.

As illustrated in FIG. 5, the center pillar 18 forms a closed cross-section 92 on center pillar side (also see FIG. 11) bearing the rigidity of the vehicle body and collision performance, together with the center pillar outer 42 formed of the high strength steel sheet of the inner frame 26 and the center pillar inner 72 of the side inner panel 22. The closed cross-section 92 on center pillar side is formed continuously to the second roof closed cross-section 94B including the outer roof side rail portion 64 formed of the low strength steel sheet of the outer frame 27 and the inner roof side rail portion 54 formed of the high strength steel sheet of the inner frame 26. An upper end 72a of the center pillar inner 72 is joined to the lower bent portion 74b of the roof side rail inner 74.

Figure 6:
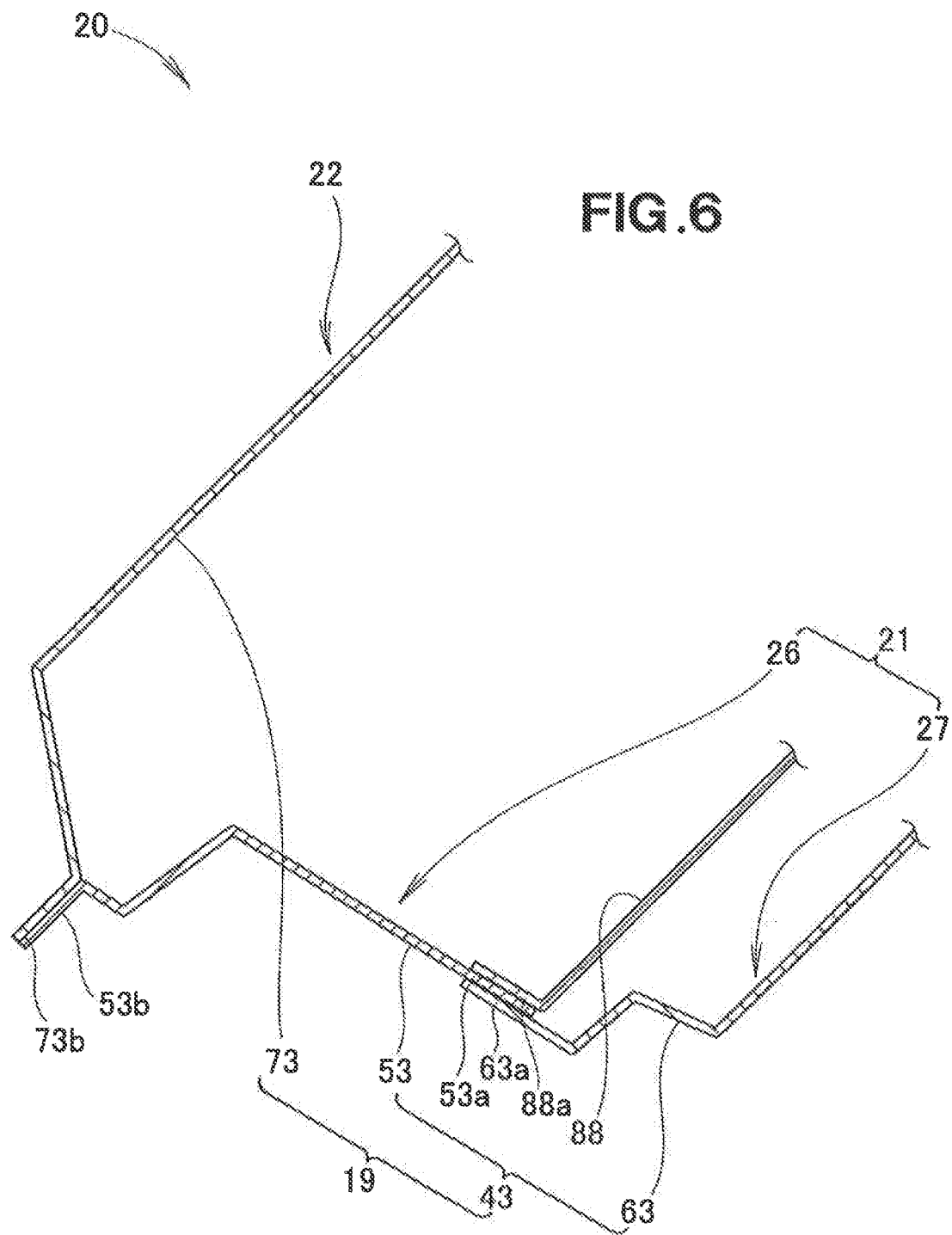
FIG. 6 is a cross-sectional view taken along line 6-6 of FIG. 1.

As illustrated in FIG. 6, the rear pillar 19 includes the rear pillar outer 43, rear pillar inner 73, and a stiffener 88 provided between the rear pillar outer 43 and the rear pillar inner 73. End portions 53a, 63a, and 88a of the respective inner rear pillar portion 53 of the inner frame 26, the outer rear pillar portion 63 of the outer frame 27, and the stiffener (rear damper reinforcing member) 88 are joined in a manner such that the end portions are hidden behind the rear door 38.

Further, the external appearance of the rear side of the door opening 36 (FIG. 1) is formed by the outer rear pillar portion 63 of the outer frame 27. The opening-side end portion 53b of the inner rear pillar portion 53 formed of the high strength steel sheet of the inner frame 26 is joined to the opening-side end portion 73b of the rear pillar inner 73, thereby forming a closed cross-section bearing the rigidity of the vehicle body and collision performance on the rear pillar 19. The rear fender 29 (FIG. 1) forming the side portion of the trunk room 14 (FIG. 1) is provided at the rear pillar 19 on the rear side of the vehicle body.

Figure 7:
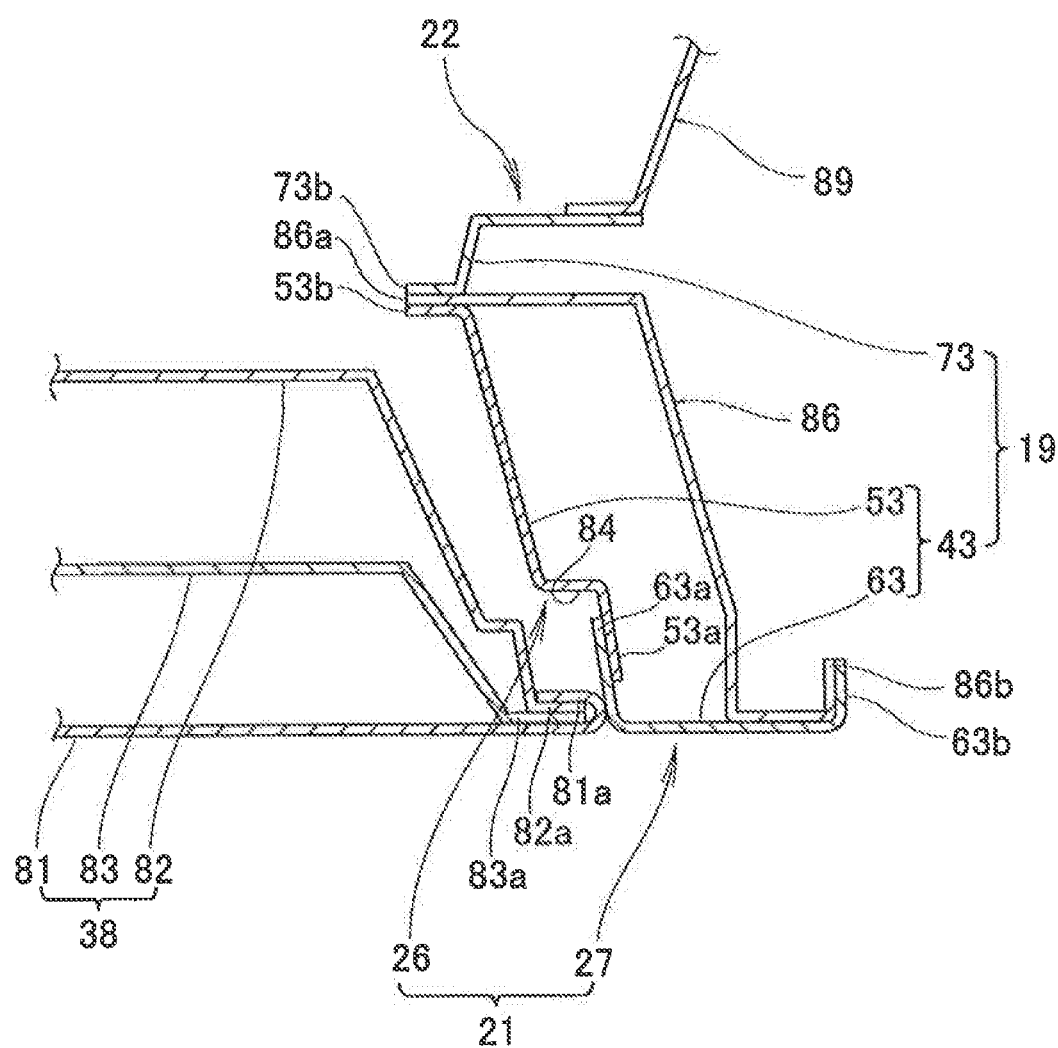
FIG. 7 is a cross-sectional view taken along line 7-7 of FIG. 1.

As illustrated in FIG. 7, the rear pillar outer 43 is joined to the rear wheel house extension 86 at the lower portion of the rear pillar 19, thereby forming a closed cross-section bearing the rigidity of the vehicle body and collision performance. More specifically, a door opening-side end portion 86a of the rear wheel house extension 86 is joined to the door opening-side end portion 53b of the inner rear pillar portion 53 and the door opening side end portion 73b of the rear pillar inner 73. A wheel house-side end portion 86b of the rear wheel house extension 86 is joined to a wheel house-side end portion 63b of the outer rear pillar portion 63.

The rear pillar inner 73 is joined to a wheel house inner (wheel house) 89. A receiving surface 84 that receives an input from a door beam 83 of the rear door 38 is formed on the inner rear pillar portion 53 formed of the high strength steel sheet of the inner frame 26 of the side outer panel 21.

As illustrated in FIG. 7, the rear door 38 includes a door panel outer 81 that forms the external appearance of the vehicle body 11, a door panel inner 82 provided on the vehicle interior 12 side of the door panel outer 81, and the door beam 83 provided at the door panel inner 82 to resist load from the side of the vehicle body.

The door beam 83 is a member formed by the press-forming of a sheet metal. An end portion 82a of the door panel inner 82 and a rear end 83a of the door beam 83 are integrally fixed to a rear end 81a of the door panel outer 81. The front door 37 (FIG. 1) has a configuration substantially same as the rear door 38.

Figure 9:
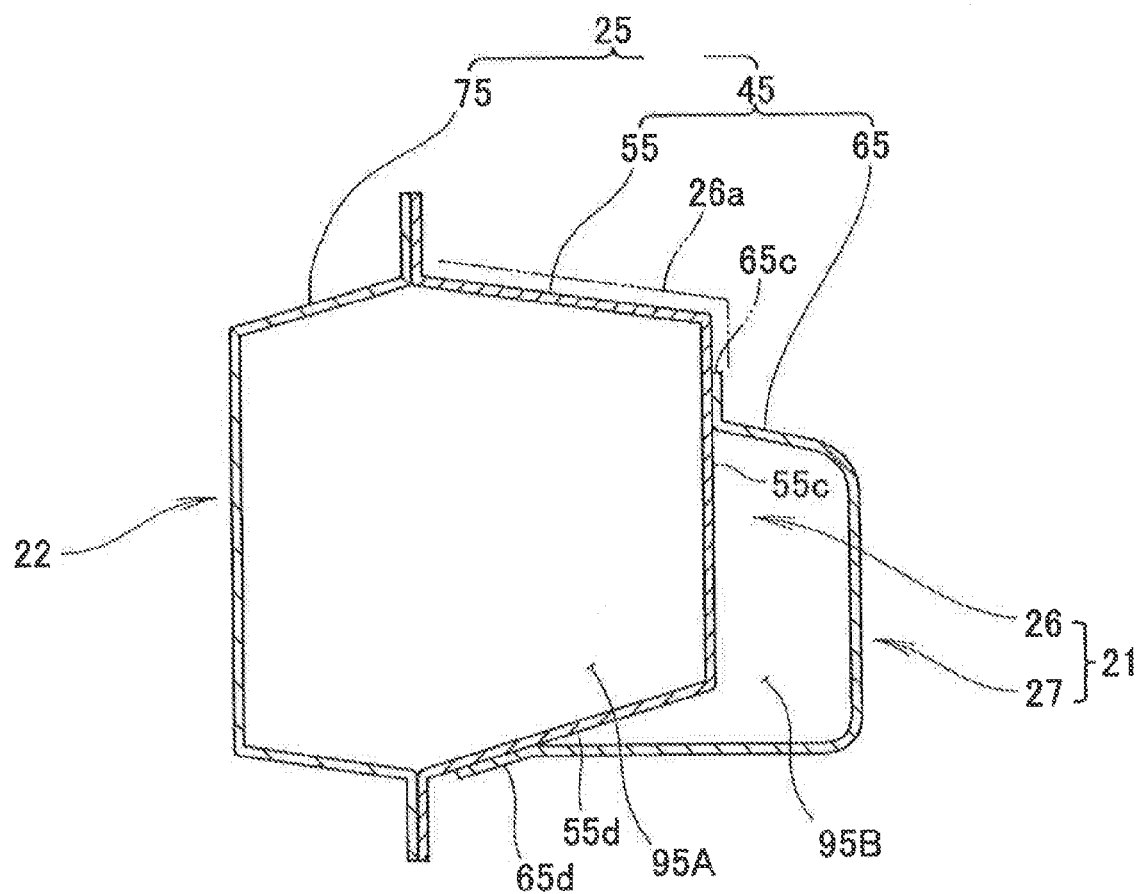
FIG. 9 is a cross-sectional view taken along line 9-9 of FIG. 1.

As illustrated in FIG. 9, the side sill 25 includes a side sill outer 45 and a side sill inner 75 and forms a closed cross-section. More specifically, a first closed cross-section 95A on side sill side is formed by the inner side sill portion 55 of the inner frame 26 and the side sill inner 75. A second closed cross-section 95B on side sill side is formed by the inner side sill portion 55 and the outer side sill portion 65. As illustrated in FIG. 9, the external appearance below the door openings 35 and 36 (FIG. 1) are formed by the outer side sill portion 65 of the outer frame 27.

Figure 8:
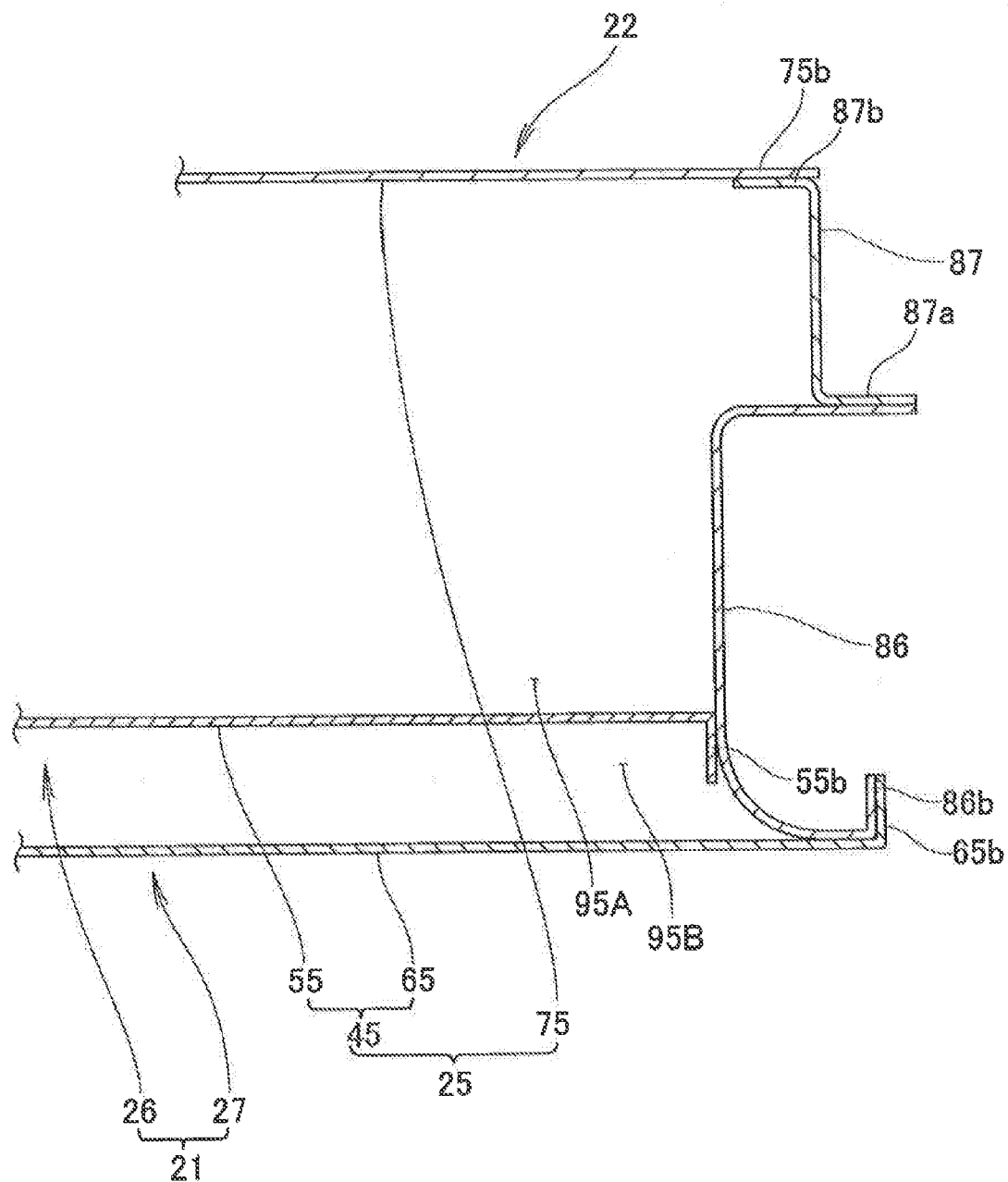
FIG. 8 is a cross-sectional view taken along line 8-8 of FIG. 1.

As illustrated in FIG. 8, a rear end 55b of the inner side sill portion 55 is joined to the rear wheel house extension 86 at the rear portion of the side sill 25, a rear end 65b of the outer side sill portion 65 is joined to a wheel house-side end portion 86b of the rear wheel house extension 86, an inner end 87a of the side sill inner end 87 is joined to the rear wheel house extension 86, and a rear end 75b of the side sill inner 75 is joined to an outer end 87b of the side sill inner end 87.

Figure 10:
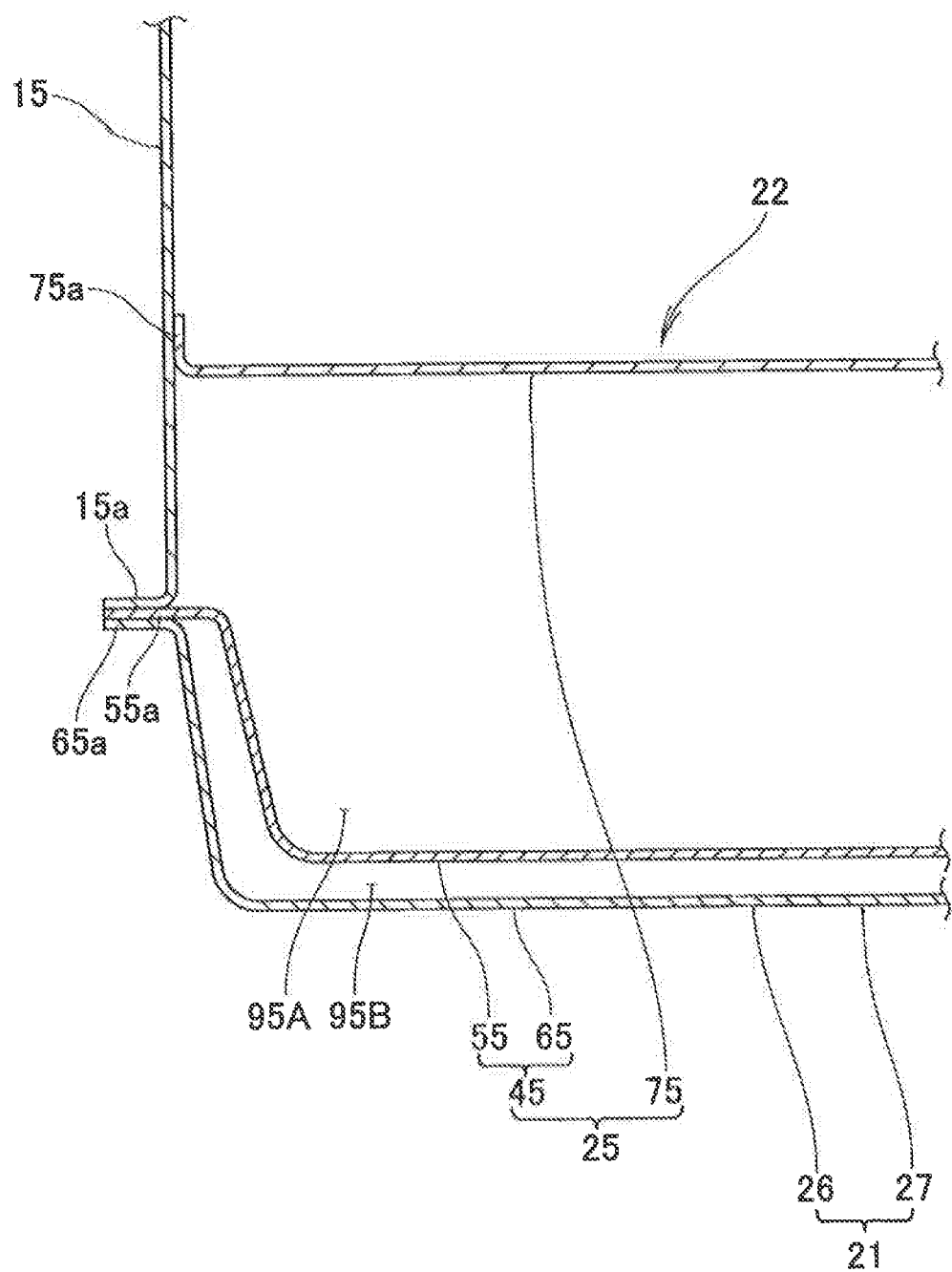
FIG. 10 is a cross-sectional view taken along line 10-10 of FIG. 1.

As illustrated in FIG. 10, at the front portion of the side sill 25, a front end 75a of the side sill inner 75 is joined to the side end portion 15a of the dashboard lower 15 on the inner side of the vehicle width direction. A front end 55a of the inner side sill portion 55 and a front end 65a of the outer side sill portion 65 are joined to the side end portion 15a of the dashboard lower 15.

Figure 12:
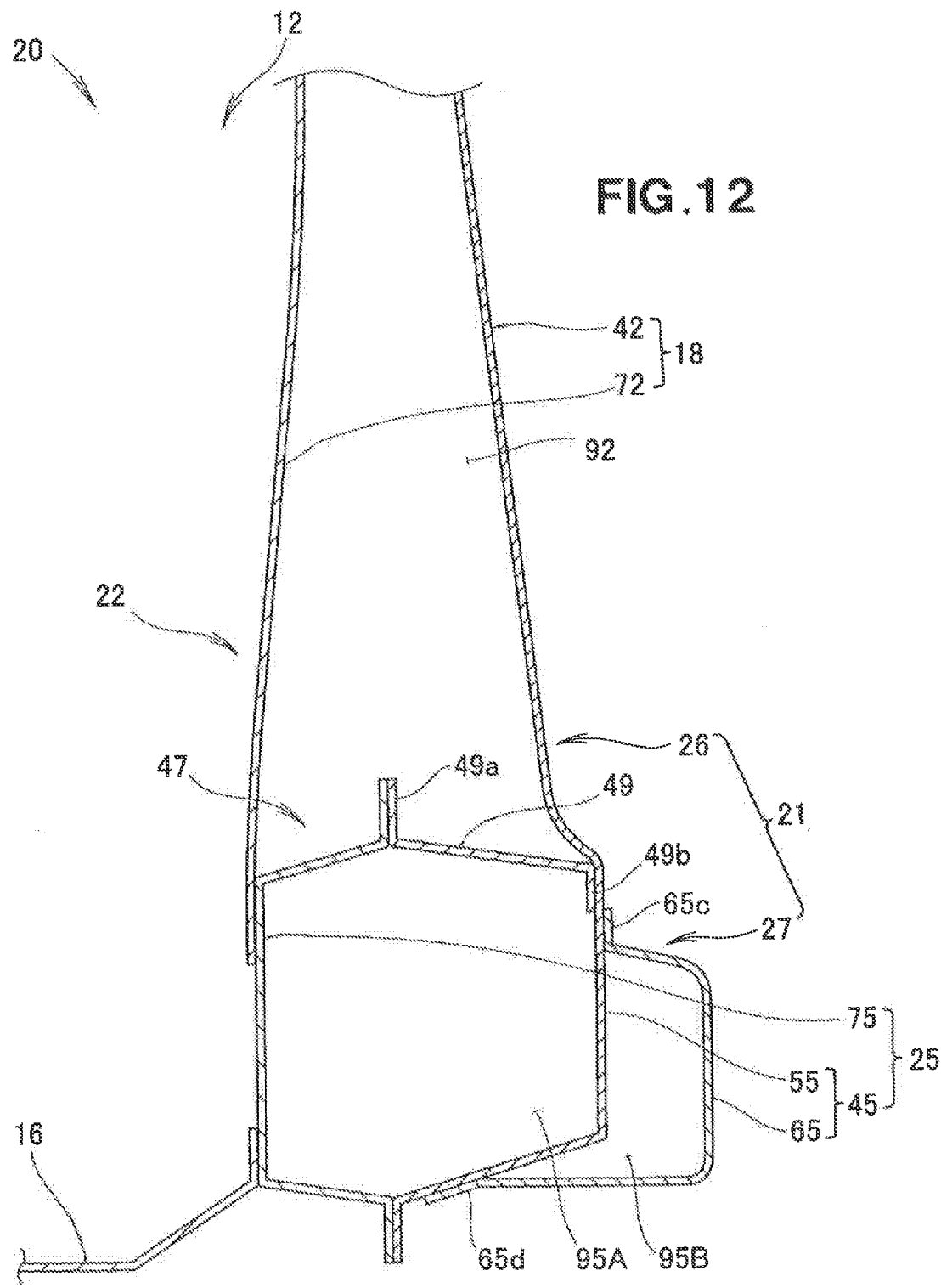
FIG. 12 is a cross-sectional view taken along line 12-12 of FIG. 1.
Figure 13:
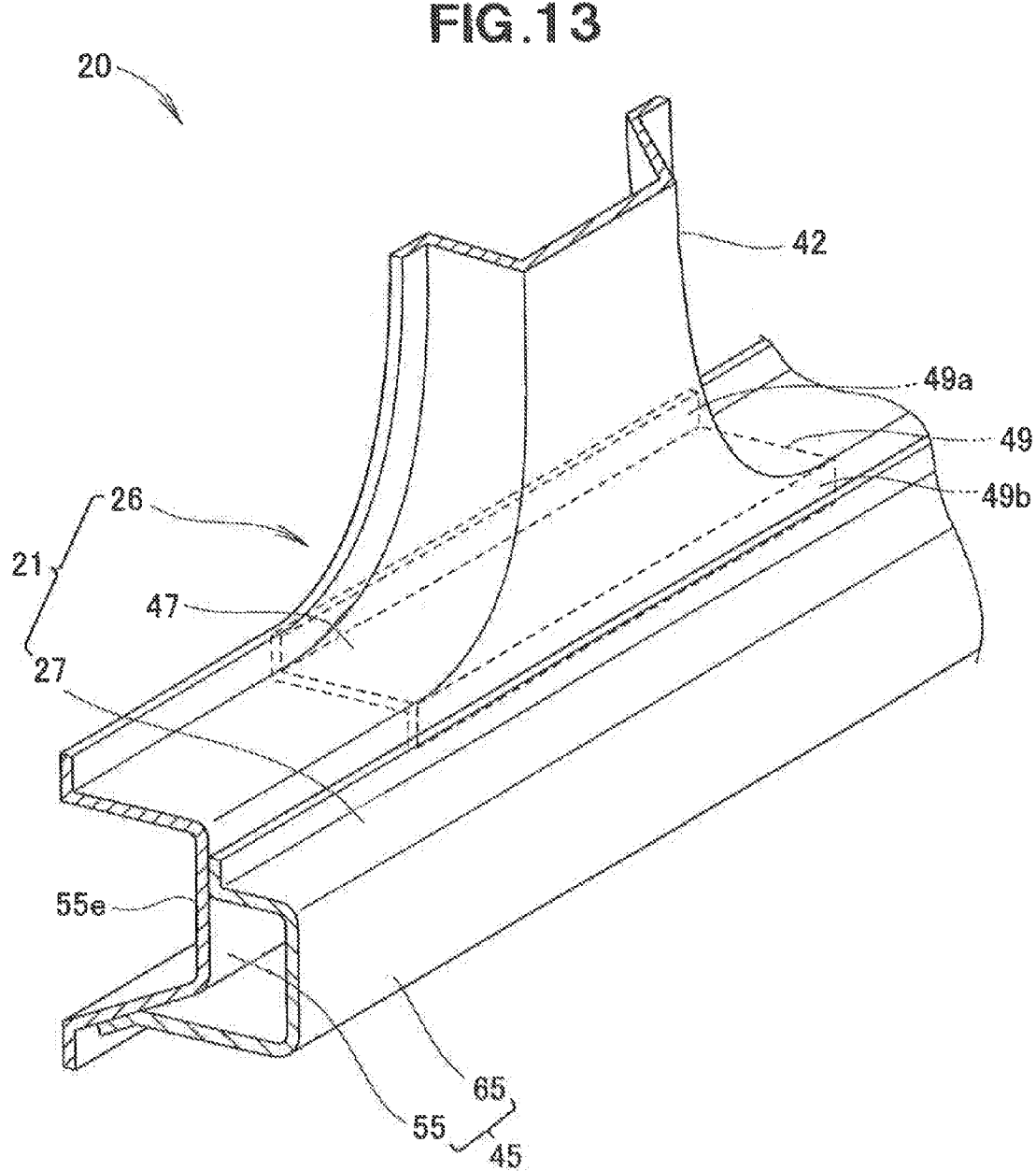
FIG. 13 is a perspective view illustrating an enlarged area 13 of FIG. 2.

As illustrated in FIG. 9, an upper end 65c and a lower end 65d of the outer side sill portion 65 are respectively joined to a side surface 55c and a lower surface 55d of the inner side sill portion 55. The joined part of the upper end 65c of the outer side sill portion 65 and the side surface 55c of the inner side sill portion 55 is hidden behind the door and does not deteriorate the external appearance. Also, as illustrated in FIG. 12, a floor panel 16 is joined to the vehicle interior 12 side of the side inner panel 22.

As illustrated in FIGS. 11 to 14, since the inner frame 26 is formed of one steel sheet, an opening 48 (FIG. 14) is formed at a crossing portion 47 where the center pillar outer 42 of the inner frame 26 and the inner side sill portion 55 of the inner frame 26 cross. To increase strength and rigidity of the crossing portion 47, a lid member (patch) 49 for closing the opening 48 is welded from the inside of the inner side sill portion 55 and closes the opening 48.

Figure 14:
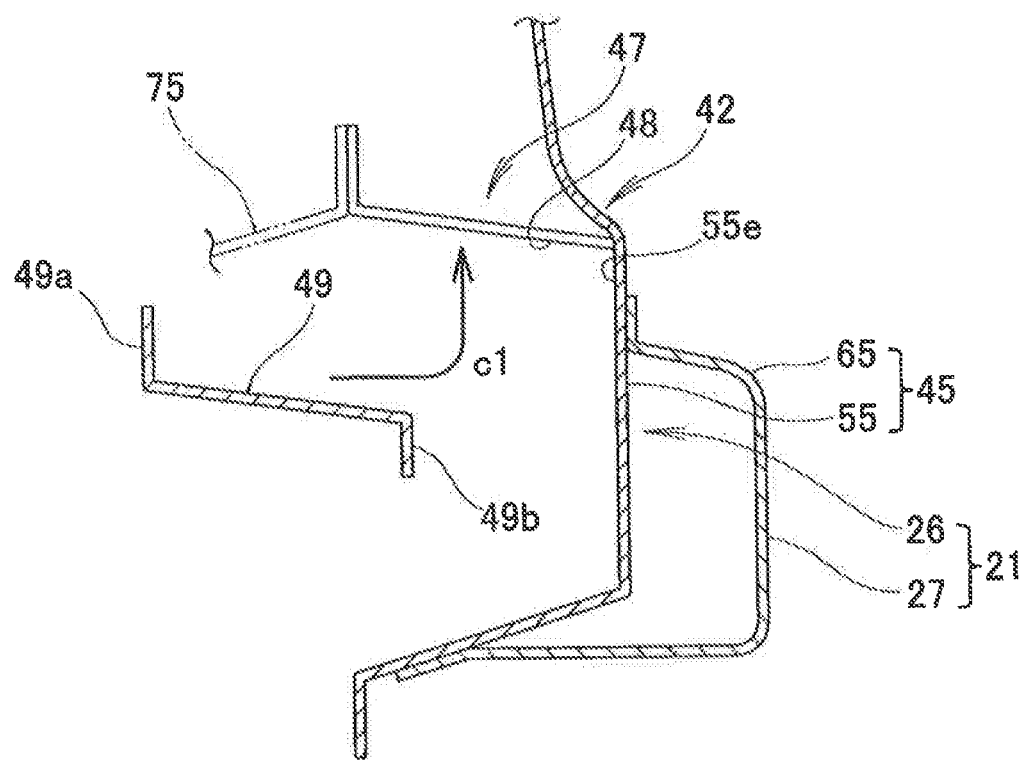
FIG. 14 is a diagram illustrating effect of a lid member provided on a center pillar and a side sill of the vehicular side panel structure according to the present invention.

As illustrated in FIG. 14, the lid member 49 is set at the opening 48 from the lower side of the inner frame 26 as indicated by an arrow c1, and an inner flange 49a of the lid member 49 is joined to the side sill inner 75 and an outer flange 49b of the lid member 49 is joined to an inner surface 55e of the inner side sill portion 55, thereby closing the opening 48. In other words, the lid member 49 is also configured to form the first closed cross-section 95A on side sill side (FIG. 12).

Figure 16:
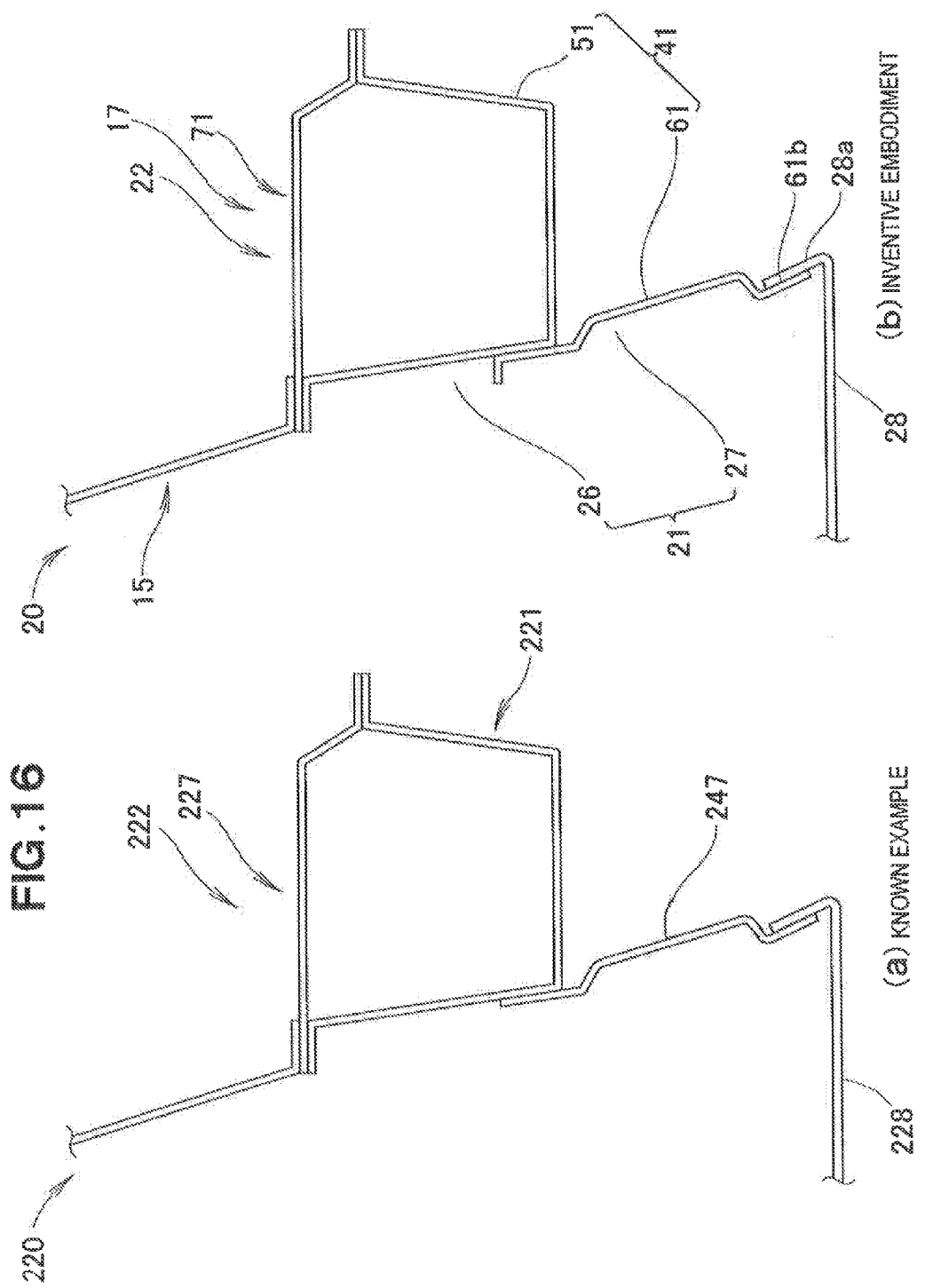
FIGS. 16(a) and 16(b) are diagrams illustrating comparison of a front pillar of the vehicular side panel structure illustrated in FIG. 2.

As illustrated in FIGS. 15 to 17, a side panel structure 220 for a vehicle in a comparative example includes a side outer panel 221 on a vehicle exterior side and a side inner panel 222 on a vehicle interior 12 side. The side outer panel 221 includes an upper frame portion 223 integrally formed with an upper portion of the side inner panel 222, a lower frame portion 224 joined to the upper frame portion 223 and integrally formed with a lower portion of the side inner panel 222, and a center pillar outer 225 having an upper end joined to the upper frame portion 223 and having a lower end joined to the lower frame portion 224.

A front pillar outer upper portion 231 of the upper frame portion 223 is joined to a front pillar outer lower portion 241 of the lower frame portion 224, a rear pillar outer 233 of the upper frame portion 223 is joined to a side sill outer 242 of the lower frame portion 224, and a center pillar outer 225 is joined between the roof side outer 232 and the side sill outer 242, thereby forming the side outer panel 221.

The upper frame portion 223 includes the front pillar outer upper portion 231, roof side outer 232, rear pillar outer 233, and rear fender 234. The upper frame portion 223 is integrally formed with a standard steel sheet (270 MPa class steel sheet).

The lower frame portion 224 is integrally formed with the front pillar outer lower portion 241 and the side sill outer 242. The lower frame portion 224 is integrally formed with a high strength steel sheet (980 MPa class steel sheet). The center pillar outer 225 is integrally formed with the high strength steel sheet (1500 MPa class steel sheet).

In the side outer panel 221 of side panel structure 220 for a vehicle in the comparative example, since the upper frame portion 223, lower frame portion 224, and center pillar outer 225 are joined, seams D1 to D6 for joining these components are generated. It is necessary to apply sealer to the seams D1 to D6 for preventing entry of rainwater, but this sealer applying work is a difficult work as is carried out manually, and also provides unfavorable external appearance. Further, since the roof side outer 232 of the upper frame portion 223 is formed of a standard steel sheet, a reinforcing member 236 is necessary to improve strength.

The side panel structure 20 according to the embodiment, the side outer panel 21 includes the inner frame 26 formed of the high strength steel sheet having the high tensile strength and outer frame 27 provided on the outer peripheral portion 26a of the inner frame 26 and formed of the material by which the external appearance can be easily formed. Therefore, the inner frame 26 can be formed by one steel sheet although the high strength steel sheet having the high strength and rigidity is used for the side outer panel 21. With this configuration, it is not necessary to apply the sealer for preventing entry of rainwater because there is no seam (seal line).

As illustrated in FIG. 1, the respective strength of the front pillar 17, center pillar 18, or rear pillar 19 is varied by changing conditions of the hot stamp molding for the inner frame 26 (FIG. 2) or using different high tension material for the respective components, thereby allowing the front pillar 17, center pillar 18, and rear pillar 19 to have the different tensile strength.

Additionally, the side outer panel 21 includes the closed cross-sections 91, 92, 94A, 94B, 95A and 95B (FIGS. 3 to 12), which are the side walls of the vehicle body at the periphery of the door openings 35 and 36, formed by the inner frame 26 formed of the high strength steel sheet having the high tensile strength and the side inner panel 22. Therefore, the reinforcing member provided at the roof rail outer can be eliminated to reduce the weight. Further, the inner frame 26 of the side outer panel 21 formed of the high strength steel sheet surrounds the entire periphery of the door openings 35 and 36 without any seams, and therefore the rigidity of the vehicle body and collision performance are increased by the side walls of the vehicle body including the closed cross-sections 91, 92, 94A, 94B, 95A and 95B formed at the periphery of the door openings 35 and 36 with the inner frame and the side inner panel.

Additionally, since the receiving surface 84 that receives the input from the door beam 83 of the rear door 38 is formed on the inner frame 26 (inner rear pillar portion 53) of the side outer panel 21, the door beam 83 can be directly received by the inner frame 26 formed of the high strength steel sheet having the high tensile strength.

As illustrated in FIG. 17(a), a side sill 226 of the side panel 220 for a vehicle includes the side sill outer 242 and a side sill inner 243. The side sill 226 is a framework member that protects the side of the lower end of the vehicle body from the outside in the vehicle width direction. It is not possible to form an external surface shape of the vehicle body only with the side sill outer 242 at the side sill 226, and therefore a separate side sill garnish 246 had to be configured as the side outer panel 221.

As illustrated in FIG. 17(b), in the side panel 20 for a vehicle according to the present embodiment, the closed cross-section (first closed cross-section on side sill side) 95A is formed by the side sill 25 together with the inner frame 26 and the side inner panel 22, and since the external appearance below the door openings 35 and 36 is improved by the outer frame 27, the separate side sill garnish becomes unnecessary.

As illustrated in FIG. 16(a), an enclosure 247 is separately provided to cover a space between a front pillar 227 and a front fender 228 of the side panel structure 220 in the comparative example.

As illustrated in FIG. 16(b), the rear edge 28a of the front fender 28 that covers the side of the front portion of the vehicle body is fixed to the outer frame 27 (outer front pillar portion 61) of the side outer panel 21 at the front pillar 17 of the side panel structure 20 according to the present embodiment. Therefore, the outer frame 27 can serve as a substitute for the enclosure 247 that covers the space between the front pillar 227 and front fender 228 of the side panel structure 220 for a vehicle according to the comparative example.

As illustrated in FIGS. 1 and 2, the side panel structure 20 includes the side outer panel 21 on the vehicle exterior side and the side inner panel 22 on the vehicle interior 12 side, and the structure of the closed cross-section is formed by the inner frame 26 of the side outer panel 21 and the side inner panel 22 at the periphery of the door openings 35 and 36.

The side outer panel 21 includes the inner frame 26 formed of the high strength steel sheet having the high tensile strength, and the outer frame 27 formed at the outer peripheral portion 26a of the inner frame 26 and formed of the material by which the external appearance can be easily formed. Therefore, the inner frame 26 can be formed by one steel sheet although the high strength steel sheet having the high strength and rigidity is used for the side outer panel 21. With this configuration, the inner frame 26 of the side outer panel 21 formed of the high strength steel sheet surrounds the entire periphery of the door openings 35 and 36 without any seam, and the side walls of the vehicle body including the closed cross-section 91, 92, 94A, 94B, 95A and 95B at the periphery of the door openings 35 and 36 are formed by the inner frame and the side inner panel increases the rigidity of the vehicle body and improves collision performance. Further, it is not necessary to apply the sealer for preventing entry of rainwater because there is no seam (seal line) at the inner frame. As a result, the sealer applying work may be eliminated and further appearance property of the vehicle body is improved.

The high tension material may be used for the inner frame 26, besides the hot stamp molding. In the case of using the high tension material, manufacturing cost can be reduced, and further the high strength steel sheet (high tension material) having 1000 MPa or more strength can be used because the material is for a non-design surface without sharp form, such as an area hidden behind the outer frame, thereby improving the rigidity of the vehicle body and collision performance.

Since the inner frame 26 is formed of the high strength steel sheet having the high tensile strength, it is possible to eliminate the reinforcing member which has been necessary for the structure of the closed cross-section at the periphery of the door openings 35 and 36 according to the related art. As a result, the weight of the vehicle body 11 can be reduced.

The outer frame 27 of the outer peripheral portion 26a of the inner frame 26 is formed of the low strength steel sheet having the low tensile strength. The low strength steel sheet has the high ductility and is easily molded, and therefore it is possible to form sharply the ridgeline of the roof side rail 24 of the side outer panel 21 facing the outer edge of the door openings 35 and 36. As a result, the appearance property of the vehicle body 11 can be improved. Since this outer frame 27 forms the external appearance where no load of the vehicle body is basically applied, the aluminum alloy sheet or the resin sheet may be used instead of the low strength steel sheet having the low tensile strength.

As illustrated in FIGS. 1 and 9, the closed cross-section (first closed cross-section on side sill side) 95A is formed by the side sill 25 as a structure together with the inner frame 26 and the side inner panel 22 at the side panel structure 20 for a vehicle, and decorativeness of the external appearance below the door openings 35 and 36 is improved by the outer frame 27. Accordingly, the separate side sill garnish becomes unnecessary. With this configuration, the side sill garnish such as a side spoiler may be adopted only for a type of vehicle that requires the side sill garnish due to design, thereby reducing the cost of the vehicle body 11 of a basic type of vehicle.

As illustrated in FIGS. 1 and 2, at the side panel 20 for a vehicle, the inner frame 26 is formed by applying the hot stamp molding to the high strength steel sheet, and each strength of the front pillar 17, center pillar 18, or rear pillar 19 is varied by changing conditions of the hot stamp molding for the inner frame 26, thereby allowing the front pillar 17, center pillar 18, and rear pillar 19 to have the different tensile strength. By utilizing a known technology of the hot stamp molding with different strength, the front pillar 17, center pillar 18, and rear pillar 19 can have the different tensile strength, and also appropriate strength is applied to the front pillar 17, center pillar 18, and rear pillar 19. Other material such as the high tension material and the tailored blank material may be applied.

As illustrated in FIG. 16, the rear edge 28a of the front fender 28 that covers the side of the front portion of the vehicle body is fixed to the outer frame 27 of the side outer panel 21 at the side panel structure 20, and therefore the outer frame 27 can serve as the substitute for the separate enclosure 247 that covers the space between the front pillar 17 and front fender 228 in the related art. As a result, the enclosure 247 can be eliminated, thereby achieving both cost reduction of the vehicle body 11 and weight reduction of the vehicle body 11.

As illustrated in FIGS. 1 and 7, the receiving surface 84 of the high strength steel sheet for receiving the input from the door beam 83 of the vehicle door 38 is formed on the inner frame 26 of the side outer panel 21 at the side panel structure 20. Therefore, the door beam 83 can be directly received by the inner frame 26 formed of the high strength steel sheet having the high tensile strength. The door beam 83 is provided at the vehicle door 38 that covers the door opening 36 and increases rigidity and strength of the vehicle door 38. As a result, the rigidity of the side portion of the vehicle body 11 can be improved.

As illustrated in FIGS. 1 and 7, the receiving surface 84 that receives the input from the door beam 83 of the vehicle door (rear door) 38 is formed on the inner frame 26 (inner rear pillar portion 53) of the side outer panel 21 at the vehicular side panel structure according to the present invention, but the configuration is not limited thereto. The receiving surface that receives the input from the door beam of the vehicle door (front door) may be formed on the center pillar outer 42 formed of the high strength steel sheet.

Further, the aluminum alloy sheet or the resin sheet can be applied as the material for the outer frame 27 that essentially involves the external appearance design, besides the low strength steel sheet. The outer frame 27 is the design component which does not support the load, and therefore it is possible to achieve more weight reduction and external appearance improvement by use of the sharp form or coating property. In the above cases, joining of the inner frame 26 and outer frame 27 is carried out by bonding or braze-welding the aluminum alloy sheet to the high strength steel sheet, or by bonding the resin sheet to the high strength steel sheet.

INDUSTRIAL APPLICABILITY

The side panel for a vehicle according to the present invention is suitable for adopting in a passenger vehicle such as a sedan car or a van.

REFERENCE SIGNS LIST

11 Vehicle body
12 Inside vehicle (Vehicle interior)
17 Structure (Front pillar)
18 Structure (Center pillar)
19 Structure (Rear pillar)
20 Side panel structure for vehicle
21 Side outer panel
22 Side inner panel
24 Structure (Roof side rail)
25 Structure (Side sill)
26 Inner frame
26a Outer peripheral portion of Inner frame
27 Outer frame
28 Front fender
28a Rear edge of front fender
35, 36 Door opening
38 Vehicle door (Rear door)
83 Door beam
84 Receiving Surface

The invention claimed is:
1. A vehicular side panel structure including a side outer panel provided on a vehicle exterior side and a side inner panel provided on a vehicle interior side, the side outer panel and the side inner panel jointly forming a structure of closed cross-section at a periphery of a door opening of a door, wherein the side outer panel includes an inner frame formed of a high strength steel sheet having high tensile strength greater than 500 MPa and an outer frame which is provided at an outer peripheral portion of the inner frame and forms an external appearance of a vehicle body, the outer frame having a joined portion joined to the outer peripheral portion of the inner frame, the outer frame being formed of a standard steel sheet, wherein the inner frame formed of the high strength steel sheet seamlessly surrounds an entirety of the periphery of the door opening, wherein the inner frame has an inner peripheral portion covered by the door, wherein the outer frame has an outer peripheral surface extending from the joined portion along an outer surface of the door, and wherein a center pillar outer is formed of only the inner frame.

2. The side panel structure according to claim 1, wherein the structure in which the closed cross-section is formed includes a roof side rail, and a closed cross-section shape is formed on the roof side rail by the inner frame and the outer frame.

3. The side panel structure according to claim 1, wherein the structure in which the closed cross-section is formed includes a side sill, and a closed cross-section formed by the inner frame and the outer frame is formed on the side sill.

4. The side panel structure according to claim 1, wherein the structure in which the closed cross-section is formed includes a front pillar, and the front pillar includes a closed cross-section formed by a front pillar inner of the side inner panel and the inner frame, and the outer frame is connected to a front fender.

5. The side panel structure according to claim 1, wherein the structure in which the closed cross-section is formed includes a rear pillar, and the rear pillar includes a closed cross-section formed by the joined inner frame and the outer frame and a rear wheel house extension.

6. The side panel structure according to claim 1, wherein the inner frame is either high tensile strength steel material or a hot stamp product.

7. The side panel structure according to claim 1, wherein the outer frame is any one of a low strength steel sheet, an aluminum alloy sheet, and a resin sheet.

8. The side panel structure according to claim 1, wherein the structure in which the closed cross-section is formed includes a side sill, and the side sill includes a closed cross-section formed by the inner frame and the side inner panel, and the outer frame forms an external surface below the door openings.

9. The side panel structure according to claim 1, wherein the inner frame is formed by applying hot stamp molding to the high strength steel sheet, the structure in which the closed cross-section is formed includes a front pillar, a center pillar, and a rear pillar, respective strength of the front pillar, the center pillar, and the rear pillar are varied by changing conditions of the hot stamp molding for the inner frame or by joining a plurality of high tensile strength steel material having different strength so as to allow the front pillar, the center pillar, and the rear pillar to have different tensile strength.

10. The side panel structure according to claim 1, wherein the outer frame of the side outer panel is joined to a rear edge of a front fender that covers a side of a front portion of the vehicle body.

11. The side panel structure according to claim 1, wherein a receiving surface configured to receive an input from a door beam of a vehicle door is formed on the inner frame of the side outer panel.

* * * * *